US012335225B1

(12) United States Patent
Gottlieb

(10) Patent No.: US 12,335,225 B1
(45) Date of Patent: Jun. 17, 2025

(54) NETWORK ADDRESS PORT TRANSLATION USING STATELESS MAC REWRITE

(71) Applicant: Charter Communications Operating, LLC, St. Louis, MO (US)

(72) Inventor: Erez Jordan Gottlieb, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 10 days.

(21) Appl. No.: 18/543,308

(22) Filed: Dec. 18, 2023

(51) Int. Cl.
*H04L 61/251* (2022.01)
*H04L 61/5014* (2022.01)
*H04L 101/622* (2022.01)

(52) U.S. Cl.
CPC ........ *H04L 61/251* (2013.01); *H04L 61/5014* (2022.05); *H04L 2101/622* (2022.05)

(58) Field of Classification Search
None
See application file for complete search history.

(56) References Cited

U.S. PATENT DOCUMENTS

| 8,681,695 | B1* | 3/2014 | Krishnan | H04L 61/5014 370/395.54 |
| 9,654,331 | B1* | 5/2017 | Singh | H04L 69/329 |
| 2006/0140164 | A1* | 6/2006 | Patel | H04L 61/5076 370/400 |
| 2006/0159100 | A1* | 7/2006 | Droms | H04L 12/2856 370/395.2 |
| 2007/0276905 | A1* | 11/2007 | Durand | H04L 67/52 709/203 |
| 2009/0285215 | A1* | 11/2009 | Kaippallimalil | H04L 61/103 370/392 |
| 2012/0218910 | A1* | 8/2012 | Sarikaya | H04L 12/1836 370/252 |
| 2012/0314617 | A1* | 12/2012 | Erichsen | H04L 12/2898 370/254 |
| 2012/0314705 | A1* | 12/2012 | Howard | H04L 45/16 370/390 |
| 2013/0227155 | A1* | 8/2013 | Dec | H04L 67/14 709/228 |

(Continued)

FOREIGN PATENT DOCUMENTS

WO    WO-2014169240 A1 * 10/2014 ........... H04L 12/282

*Primary Examiner* — Phyllis A Book
(74) *Attorney, Agent, or Firm* — THE MARBURY LAW GROUP, PLLC

(57) ABSTRACT

Various methods and processing systems are disclosed that provide an access termination component in a service provider network for managing network traffic. The method may include receiving dynamic host configuration protocol version 6 (DHCPv6) that solicits messages from one or more customer premise devices (CPEs) seeking network configuration information, transmitting DHCPv6 provisioning responses to the one or more CPEs, each DHCPv6 provisioning response which may include IPv6 provisioning parameters, updating an IPv4 prefix table with IPv4 prefixes, the IPv4 prefix table storing information related to networks that share IPv4 addresses, determining a 48-bit address and port set identifier value and a corresponding media access control (MAC) address, and adding the determined 48-bit address and port set identifier value and the corresponding MAC address into an address and port set identifier to MAC hash table.

21 Claims, 11 Drawing Sheets

(56) References Cited

U.S. PATENT DOCUMENTS

| | | | |
|---|---|---|---|
| 2013/0254423 A1* | 9/2013 | George, IV | H04L 61/4511 709/238 |
| 2013/0301650 A1* | 11/2013 | Zou | H04L 61/2514 370/467 |
| 2014/0044012 A1* | 2/2014 | Singh | H04L 41/0816 370/254 |
| 2014/0215091 A1* | 7/2014 | Singh | H04L 12/2898 709/245 |
| 2014/0330943 A1* | 11/2014 | Brzozowski | H04L 61/5014 709/220 |
| 2015/0200806 A1* | 7/2015 | Donley | H04L 61/5014 370/392 |
| 2016/0014071 A1* | 1/2016 | Asati | H04L 61/251 709/245 |
| 2017/0149614 A1* | 5/2017 | Zheng | H04L 45/021 |
| 2022/0345439 A1* | 10/2022 | Wheelock | H04L 43/0894 |

\* cited by examiner

NETWORK ADDRESS PORT TRANSLATION USING STATELESS MAC REWRITE

BACKGROUND

The proliferation of internet-connected devices and continuous evolution of internet technologies have increased the demand for IP addresses. The Internet Protocol version 4 (IPv4) addressing system provides a reservoir of approximately 4.3 billion unique addresses. However, with the exponential growth of the Internet and the increasing integration of IoT devices, this reservoir of unique addresses is no longer adequate to meet consumer demands.

The introduction of Internet Protocol version 6 (IPv6) sought to rectify this shortage, offering a vastly increased number of addresses. Yet, the transition from IPv4 to IPv6 has been gradual due to factors such as legacy infrastructure, compatibility issues, and adaptation costs. During this period of coexistence, the challenge has been to enable seamless communication between the old (IPv4) and the new (IPv6) realms without significant overhauls to existing network infrastructure.

One of the technical challenges faced by service providers and organizations during this transition is the task of efficiently managing the limited pool of available IPv4 addresses, while simultaneously supporting the newer IPv6 standard. Traditional methods such as Network Address Translation (NAT) have been used to allow multiple devices in a local network to share a single public IPv4 address. However, such solutions are not adequate for managing the ever-growing number of devices and the user demands for simultaneous high-speed connections.

Carrier-grade NAT or Large Scale NAT (CGN/LSN) is a more recent technology designed to manage IP address translation at a larger, often ISP-level scale. While CGN/LSN systems overcome some of the limitations of the more conventional NAT based solutions, they also introduce other limitations and technical challenges, such as increased complexity, potential for double NAT scenarios, and challenges with certain types of traffic and applications. In addition, maintaining stateful information for each NAT operation may lead to scalability concerns and have a negative impact on the performance of the network and user devices. Accordingly, new and improved solutions that better support the integration and coexistence IPv4 and IPv6 traffic, reduce overheads, and improve data flow, network efficiency, latency, performance, and/or power consumption characteristics of the network components or user devices will be beneficial to network service providers and consumers of their services.

SUMMARY

Some aspects may include methods performed by a processing system in an access termination component in a service provider network for managing network traffic, which may include receiving, by the processing system, dynamic host configuration protocol version 6 (DHCPv6) solicit messages from one or more customer premise devices (CPEs) seeking network configuration information, transmitting, by the processing system, DHCPv6 provisioning responses to the one or more CPEs, each DHCPv6 provisioning response which may include IPv6 provisioning parameters, updating, by the processing system, an IPv4 prefix table with IPv4 prefixes, the IPv4 prefix table storing information related to networks that share IPv4 addresses, determining, by the processing system, a 48-bit address and port set identifier value and a corresponding media access control (MAC) address, and adding, by the processing system, the determined 48-bit address and port set identifier value and the corresponding MAC address into an address and port set identifier to MAC hash table.

Some aspects may further include receiving IPv4 packets and determining whether the destination address of a received IPv4 packet corresponds to a local source network address translation (SNAT)/network address and port translation (NAPT) endpoint. Some aspects may further include receiving IPv4 packets and determining whether the received IPv4 packets are downstream packets or upstream packets. Some aspects may further include, in response to determining that the received IPv4 packets are downstream packets, determining whether the received packets match an entry in the address and port set identifier to MAC hash table, and rewriting a header in the received packets to direct the packets to a CPE with the corresponding MAC address.

Some aspects may further include intercepting and proxying a provisioning request. Some aspects may further include initiating, by a processor in a subscriber customer premise device (CPE), a dynamic host configuration protocol version 6 (DHCPv6) transaction to request network configuration information from an access termination component, receiving a DHCPv6 response from the access termination component, the response which may include IPv6 provisioning parameters and augmented RFC 7598 rule data, determining an IPv4 address for the subscriber CPE based on the received IPv6 provisioning parameters, determining an IPv4 gateway prefix route and default gateway address for forwarding traffic based on the augmented RFC 7598 rule data, associating the computed IPv4 gateway prefix route with the core-facing interface, determining an allowed range of source ports for network address and port translation (NAPT) based on the received IPv6 provisioning parameters, and applying the determined range of source ports for NAPT operations on the determined IPv4 address. Some aspects may further include determining whether to bind the determined IPv4 address to a core-facing interface of the subscriber CPE or use the determined IPv4 address exclusively within Source Network Address Translation (SNAT) operations.

Further aspects may include a computing device having a processing system configured with processor-executable instructions to perform various operations corresponding to the methods summarized above. Further aspects may include a non-transitory processor-readable storage medium having stored thereon processor-executable instructions configured to cause a processing system to perform various operations corresponding to the method operations summarized above. Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
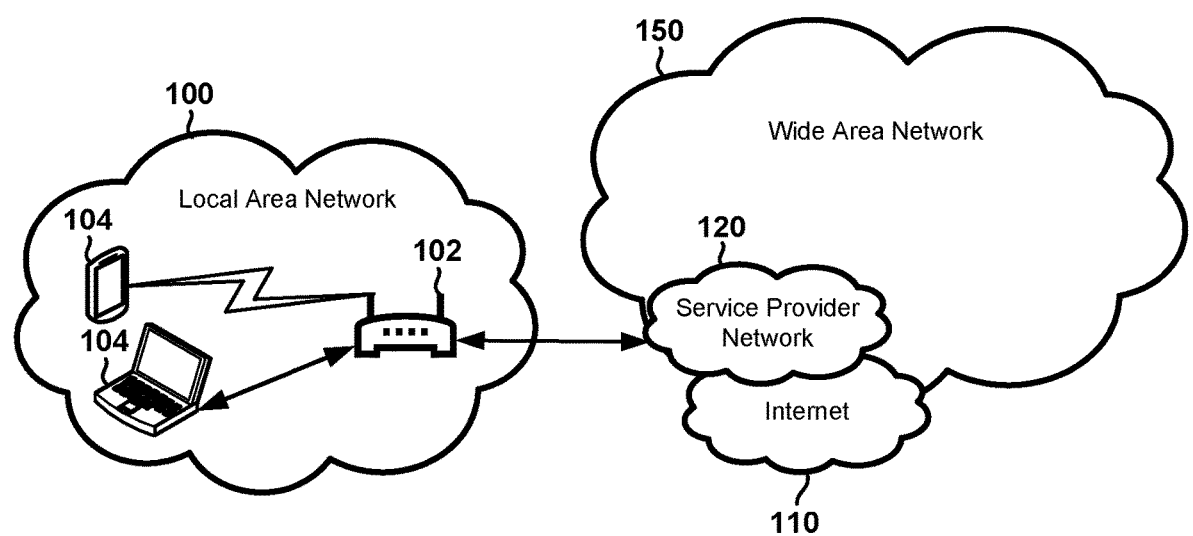
FIGS. 1A and 1B are component block diagrams illustrating example systems that could be configured to implement some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, various embodiments overcome major technical challenges faced by internet service providers, such as the increasing demands of users and the limited availability of traditional IPv4 addresses. Unlike conventional centralized Network Address Translation (NAT) architectures that often create bottlenecks and points of failure, the embodiments may adopt a distributed approach that includes using stateless MAC rewrite techniques in a distributed access architecture (DAA) core environment. The embodiments may allow for unique MAC rewrite capabilities (e.g., remove and apply a new MAC) that are particularly useful when multiple subscriber customer premises equipment (CPE) devices share a single IPv4 address. By shifting NAT operations from the DAA core to individual CPEs, the embodiments may improve scalability and adaptability while mitigating technical issues such as congestion and failure points without adding complexity. The embodiments may be especially beneficial in contexts requiring carrier-grade or large-scale NAT solutions.

The term "service provider network" is used generically herein to refer to any network suitable for providing consumers with access to the Internet or IP services over broadband connections and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, satellite networks that send and receive data etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages. Any references to terminology and/or technical details related to an individual wired or wireless communications standard or technology are for illustrative purposes only, and not intended to limit the scope of the claims to a particular communication system or technology unless specifically recited in the claim language.

The terms "user device" and "user equipment (UE)" may be used generically and interchangeably herein to refer to any one or all of satellite or cable set top boxes (STBs), laptop computers, rack mounted computers, routers, cellular telephones, smart phones, personal or mobile multi-media players, personal data assistants (PDAs), customer-premises equipment (CPE), tablet computers, smart books, palm-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known computer, processor, and/or process-related communication methodologies.

The term "processing system" is used herein to refer to one or more processors, including multi-core processors, that are organized and configured to perform various computing functions. Various embodiment methods may be implemented in one or more of multiple processors within a processing system as described herein.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "system in a package" (SIP) is used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

The term "classifier" is used here to refer to a component that may be included in an access termination component (e.g., a DAA core component, etc.) and configured to extract certain properties from network traffic and apply predetermined policies to make routing or forwarding decisions based on values derived from the extracted properties. The term "downstream classifier" may be used to refer to a classifier that is associated with data flows towards the customer device. The term "upstream classifier" may be used to refer to a classifier associated with data flows originating from the customer device and/or towards the network.

The term "port set identifier" is used herein to refer to a numerical value of up to 16 bits that may be used to delineate a specific range of port numbers within a larger set. The port set identifier may be a component of the key used in the NAT/MAC table, alongside the 32-bit IPv4 address, to form a 48-bit composite key. The port set identifier may provide granularity in specifying port ranges that are to be used for Network Address Translation (NAT) or Network Address Port Translation (NAPT) operations. The length of the port set identifier, in bits, may be determined by the sharing ratio of the SNAT/NAPT mechanism in use. For example, a sharing ratio of 2:1 might necessitate a single bit to represent the port set identifier, whereas a 16:1 sharing ratio could require 4 bits. Any preceding bits not utilized for the port set identifier may be padded with zeros to complete the composite key.

The term "NAT/MAC table" is used herein to refer to a specialized data structure that associates Network Address Translation (NAT) entries with Media Access Control (MAC) addresses. The NAT/MAC table may operate as a lookup resource to facilitate efficient routing and forwarding of data packets. The table may use a 48-bit key that combines a 32-bit IPv4 address and an additional value of up to 16 bits representing the port set identifier. This key may be matched to a corresponding MAC address value, thus enabling the system to quickly identify the correct MAC address for routing purposes. The length of the port set identifier in bits may be influenced by the sharing ratio of the Source NAT/Network Address Port Translation (SNAT/NAPT), and any unused bits may be padded with zeros.

The term "access termination component" is used herein to refer to any device or component that performs an access termination function, has visibility to the provider-facing interface MAC of the subscriber router, is responsible for the task of forwarding or switching network traffic to a destination router based on the provider-facing MAC address, and/or uses the provider-facing MAC address to determine the most efficient and accurate route for the data packets within the network. Examples of access termination components include, but are not limited to, Distributed Access Architecture (DAA) core components, Border Network Gateways (BNGs), Wireless Access Gateways (WAGs), Optical Line Terminals (OLTs), and traditional Cable Modem Termination Systems (CMTSs). The term 'access termination component' also encompasses other similar devices or systems in both wired and wireless network architectures that facilitate the management and direction of network traffic to subscriber routers. For ease of reference and to focus the discussion on the most relevant features, some of the embodiments below are described with reference to DAA components. However, nothing in this application should be used to limit the claims to DAA or any specific network component or technology unless expressly recited as such in the claims.

Many subscribers connect to the Internet via a customer-premise equipment (CPE) component/device. A CPE device may include a cable modem, digital subscriber line modem, router, switch, firewall, packet filter, wireless access point, and/or a residential gateway that provides network connectivity to a home or small office network. In particular, a CPE device may allow UE devices on the local area network (LAN) to connect to a wide area network (WAN) and ultimately the Internet. A CPE may include LAN ports (e.g., ports FE0-FE3, etc.) and a LAN interface for communicating with the various UE devices within the LAN. The CPE may include a WAN port (e.g., port FE4, etc.) and a WAN interface that allows the UE devices connected to the LAN to communicate with devices outside of the LAN.

The various embodiments may include or use any of a variety of modern devices, techniques, or technologies, including distributed access architecture (DAA), network address translation (NAT), carrier-grade NAT/large-scale NAT (CGN/LSN), dynamic host configuration protocol for IPv6 (DHCPv6), internet protocol version 4 (IPv4), internet protocol version 6 (IPv6), network address port translation (NAPT), user datagram protocol (UDP), transmission control protocol (TCP), internet control message protocol (ICMP), source network address translation (SNAT), remote authentication dial-in user service (Radius), cable modem (CM), data over cable service interface specification (DOCSIS), media access control (MAC), passive optical networks (XPON), such as gigabit passive optical network (GPON) and ethernet passive optical network (EPON).

Radius is a networking protocol that provides centralized authentication, authorization, and accounting (AAA) management for users who connect to a network. The dynamic host configuration protocol (DHCP) is a network management protocol used on Internet Protocol version 4 (IPv4) networks whereby a DHCP server dynamically assigns an IP address and other network configuration parameters to each UE device on the LAN so that each UE device may communicate with other Internet Protocol (IP) networks on the WAN. A CPE may include a DHCP server that enables UE devices to request IP addresses and networking parameters automatically from the service provider, thereby reducing the need for a network administrator or a user to manually assign the IP addresses to the UE devices.

Internet Protocol version 6 (IPv6) is the most recent version of the Internet Protocol (IP), the communications protocol that provides an identification and location system for computers on networks, and routes traffic across the Internet. The dynamic host configuration protocol for IPv6 (DHCPv6) is a network protocol used for configuring IPv6 hosts with IP addresses, IP prefixes, and other configuration data required to operate on an IPv6 network. DHCPv6 serves a similar function as its IPv4 counterpart. Most IPv6 capable devices support Stateless Address Auto-configuration (SLAAC), which is currently the preferred/most popular solution for disseminating interface address information to client devices.

Generally, a major technical challenge for internet service providers involves managing the escalating needs of users while dealing with a dwindling supply of traditional internet addresses, known as IPv4. The various embodiments overcome these and other technical challenges by intelligently directing internet traffic and allowing a single internet address to serve multiple users, thereby offering a scalable and effective method to maintain quality service.

Other solutions often use a centralized Network Address Translation (NAT) architecture. This centralization is prone to creating traffic bottlenecks and possible points of failure, thereby reducing system efficiency. The various embodiments may mitigate these limitations by adopting network address port translation using stateless MAC rewrite in a distributed access architecture core environment, enhancing the system's adaptability and scalability without compromising on efficiency or increasing complexity. Rather than merely rewriting MAC address, the components may be configured with unique MAC rewrite capabilities (e.g., to remove and apply a new MAC) for when multiple subscriber customer premises equipment (CPE) share the same IPv4 address. Unlike conventional solutions, the components may offload NAT operations from a DAA core to one or more CPEs while also addressing various technical challenges commonly associated with multiple CPEs sharing a single IPv4 address.

Some embodiments may include components configured to implement a Single IPv4 Stateless Network Address and Port Translation (NAPT) combined with Core Media Access Control (MAC) Rewrite that is particularly well suited for carrier-grade NAT or Large Scale NAT (CGN/LSN) contexts. The components may enhance scalability and flexibility by relocating NAT tasks from the DAA core to the customer premises equipment (CPE), thus reducing the chances for congestion or failure by obviating the need for centralized NAT functions in the DAA core.

Some embodiments may include components configured to use IPv6-related techniques (e.g., DHCPv6, Radius, etc.) for IP address assignment and to dynamically assign shared IPv4 addresses to multiple routers. Individual subscriber routers or CPEs may use specific information within the IPv6 provisioning parameters to determine port assignments for IPv4 NAPT, thereby making efficient use of scarce IPv4 resources and aligning well with the migration towards broader IPv6 usage.

In the downstream flow, a DAA core component may match traffic based on the address and port set identifier. Upon a successful match, the system may alter the MAC address to direct the data packet to the appropriate IPv4 subscriber. This may allow the DAA core to forgo NAT operations, potentially reducing the processing burden that may be associated with NAT operations. This may enhance overall performance. In the upstream flow, the DAA core may use a standard routing table for forwarding data toward the core or Internet, especially for non-local destinations or attached non-SNAT/NAPT targets. It should be noted that entries mapping specific address and port set identifier combinations to corresponding MAC addresses generally apply to traffic that is "hairpinned" through the DAA core and effectively processed as a downstream flow.

Collectively, these components may enhance network performance by altering the manner in which large-scale NAT operations are carried out in distributed access architectures. The various embodiment systems and methods may offer a more effective, scalable, and dependable solution for network operations, especially in service provider networks facing challenges linked to limited IPv4 resources and the migration towards IPv6.

Some embodiments may include components configured to implement a network address port translation using stateless MAC rewrite in a distributed access architecture core environment. The embodiments may be particularly well suited for carrier-grade NAT or Large Scale NAT (CGN/LSN) scenarios. Some embodiments may improve scalability and operational flexibility by offloading NAT operations from the DAA core to the customer premises equipment (CPE). In addition, the embodiments may reduce the need for a separate CGN function outside the DAA core, thereby reducing potential points of congestion or failure and/or lowering operational costs. Further, the embodiments may distribute the NAPT function closer to the end-user (stateful on the CPE and MAC rewrite on the DAA core) so that triangular routing issues commonly present in many LSN/CGN solutions may be avoided, particularly for edge-placed CDNs.

Some embodiments may include components configured to perform IPv6-based IP address provisioning operations and facilitate dynamic assignment of shared IPv4 addresses to multiple routers. Each subscriber router (or CPE) may use metadata within the IPv6 provisioning parameters to guide its choice of ports for IPv4 NAPT. This approach may contribute to the efficient use of limited IPv4 resources. In addition, the metadata may support IPv4 next-hop reachability through Layer 2/Layer 3 address mapping for traffic directed towards the core or Internet. Such functionality may be achieved without the explicit assignment of a dedicated IPv4 address to the service provider-facing interface of the subscriber router.

In the downstream flow, a DAA core component may be configured to process the values in the destination address and port, perform port mapping operations to obtain a port set identifier, and match the concatenation of the address and port set identifier to a key in the NAT/MAC table (which may include the value for the MAC rewrite). In response to detecting a successful match, the system may rewrite the MAC address to direct the packet to the intended IPv4 subscriber. Unlike conventional solutions implementing CGN/LSN, the DAA core may refrain from undertaking any NAT functions, which may reduce the processing load on the DAA core and improve the overall system performance. In the upstream flow, the DAA core component may use a routing table to forward the traffic.

The decentralized architecture provided by the various embodiments (e.g., DAA core) may allow individual subscriber routers to independently determine and apply NAT settings. This architecture may offer multiple additional advantages, including reducing the need for augmenting service provider NAT resources, maintaining compatibility with existing compliance frameworks, enabling the use of frameworks such as Data Plane Development Kit (DPDK) for compatibility with contemporary cloud-native cores, avoiding complexities such as double NAT and the necessity for additional IPv4 addresses, eliminating the need for specialized tunneling or intricate engineering techniques, supporting internet-standard Maximum Transmission Units (MTUs), removing IPv4 address scarcity as an issue as it relates to assigning a unique IPv4 address on the CPE service provider interface through the by eliminating it as an IPv4 provisioning consideration and employment of IPv6 based provisioning (such as DHCPv6), and aiding in network diagnostics by preserving compatibility with native IPv4 traceroutes.

Figure 1B:
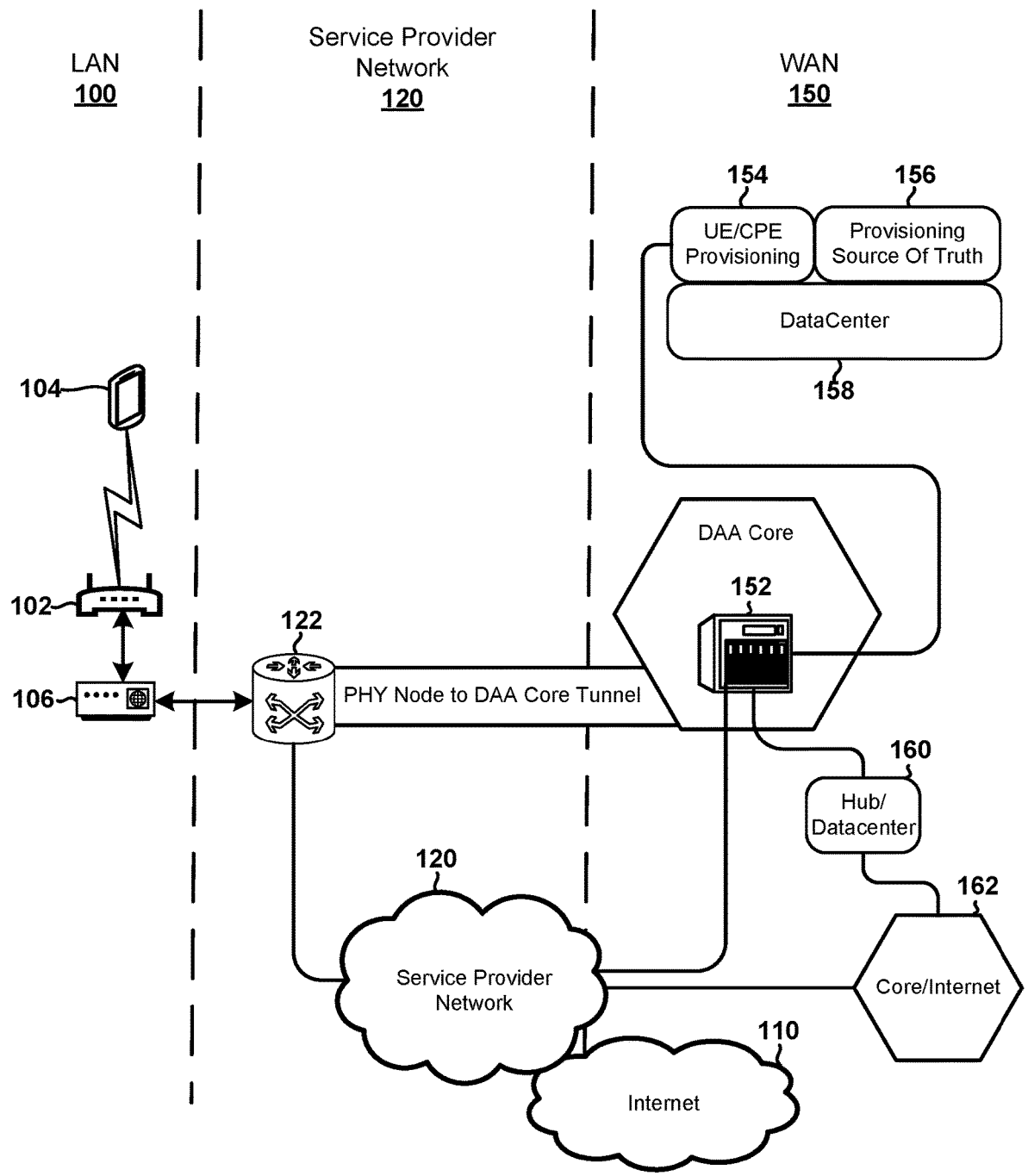

FIGS. 1A and 1B are simplified examples of a network that may be used to implement the various embodiments. In the example illustrated in FIG. 1A, the network includes a local area network (LAN) 100 and a wide area network (WAN) 150. The LAN 100 includes client devices 104 coupled to user equipment (UE)/customer premise equipment (CPE) 102 component/device via wired and wireless communication links. The CPE 102 includes communication links to a service provider network 120 within the WAN 150 that allow the client devices 104 to send and receive information to and from the Internet 110.

In the example illustrated in FIG. 1B, the network includes a LAN 100, a service provider network 120, and a WAN 150. The LAN 100 includes client devices 104, a CPE 102, and an access technology component 106 (e.g., cable modem, optical network unit (ONU), optical network terminal (ONT), etc.). The service provider network 120 includes a distributed access architecture (DAA) node 122 that may be a physical node component with a tunnel to a DAA core 152 component in the WAN 150. The WAN 150 includes the DAA core 152 component, a UE/CPE provisioning 154 component, and a provisioning source of truth 156 component, a datacenter 158 component, and a hub/datacenter 160 coupled to core/internet 162.

The UE/CPE 102 component may function as a point of connectivity for subscribers or client devices 104 aiming to access larger networks, such as the Internet 110. The UE/CPE 102 component may be an intermediary device residing within a subscriber's premises, facilitating communication between user devices 104 (e.g., personal computers, smartphones, tablets) and external networks. The UE/CPE 102 component may include various ports and interfaces for managing both local (LAN) and external (WAN) data traffic. The UE/CPE 102 component may integrate seamlessly with the dynamic host configuration protocol (DHCP) to automatically obtain IP addresses and networking configurations.

The client devices 104 may include any of a plethora of end-user devices, such as smartphones, computers, smart televisions, and tablets, that directly interact with the service provider network 120 to access online services. The client devices 104 may be primary interfaces for users, initiating data requests and receiving information. In some embodiments, the UE/CPE 102 may be configured to perform stateful SNAT/NAPT via a modified provisioning client and a unique posture calculation, which may allow for the operation of SNAT/NAPT functionalities without the need to explicitly assign an IPv4 address to the service provider-facing network interface. As a result, the client devices 104, through their continuous communication with the UE/CPE 102 and, indirectly, with the broader network, may improve the overall user experience in terms of speed, responsiveness, and connectivity quality.

The access technology component 106 may serve to facilitate bi-directional data communications and may include various types of devices depending on the network infrastructure. For example, in some embodiments, the access technology component 106 may include a cable modem (CM) suitable for hybrid fiber-coaxial (HFC). The CM may operate as a network bridge and enable communication via radio frequency channels. In a Passive Optical Network (PON) setting, the access technology component 106 may include an Optical Network Unit (ONU) that functions as the endpoint hardware device and may be compatible with either an Ethernet Passive Optical Network (EPON) or a Gigabit Passive Optical Network (GPON). In GPON networks, the access technology component 106 may include an Optical Network Terminal (ONT) that is directly connected to an Optical Line Terminal (OLT) and serves as a bridge between the GPON network and the user's network. In addition, the access technology component 106 may feature a Cable Modem Termination System (CMTS) deployed in a headend or hub site. The CMTS may be designed to enable high-speed communications between the CM and the elements in the service provider network 120. The service provider network 120 may include various components that facilitate consumer access to the Internet 110 or IP services via broadband connections.

It should be understood that Network Address Port Translation (NAPT) is inherently stateful and is executed on the CPE. It should be understood that, unlike conventional solutions, some embodiments include a DAA core 152 that eliminates the need for maintaining state except for certain exceptional traffic types, such as IPv4 fragments. This may effectively reduce the burden of supporting stateful operations on the core network.

In some embodiments, the service provider network 120 may support a Carrier-Grade NAT or Large Scale NAT (CGN/LSN) function to facilitate effective management of IPv4 address resources. In some embodiments, the DAA core 152 in the service provider network 120 does not perform the CGN/LSN function directly, but rather plays a supporting role in the broader strategy of how CGN/LSN operations are executed. In some embodiments, the actual CGN/LSN function may be managed in a distributed manner by the CPEs 102. Such a configuration may allow for the translation of private IP addresses from multiple CPEs 102 to a restricted pool of public IPv4 addresses. This approach may be especially useful for efficiently using existing IPv4 resources. The integration of NAPT may reduce hardware upgrade demands on the service provider network and enhance scalability.

In some embodiments, the service provider network 120 may also include a DAA node 122 that is configured for PHY-layer decentralization in access architectures. The DAA node 122 may serve to operate as a relay, directing data between UE/CPE 102 devices and larger network systems like DAA core 152. By relocating certain conventional core functionalities closer to the user (within the confines of the service provider network 120) the DAA node 122 may aid in the mitigation of traffic congestion, enhance data throughput, and/or create more flexible and scalable network structures.

The DAA core 152 may be configured to work in coordination with DAA nodes 122 to ensure efficient data dissemination, and to perform data processing, forwarding, and management operations. The DAA core 152 may bridge the gap between individual subscribers and vast external networks, such as the Internet 110. For example, in some embodiments, the DAA core 152 may be configured to dynamically assign IP addresses, route optimization, manage NAT/MAC forwarding tables, and perform other similar operations to ensure seamless high-speed data exchange for all connected entities.

The combination of CPE-based stateful NAPT and core MAC rewrite may provide a cohesive mechanism for addressing the limitations of typical NAT processes and IPv4 address exhaustion. By adopting deterministic procedures in NAPT and optimizing MAC-based routing in DAA core 152, this integrated approach not only enhances scalability but also improves packet-processing speed and reduces latency.

The joint implementation of CPE-based stateful NAPT and core MAC rewrite technologies may allow multiple client devices 104 to share a single IPv4 address without large degradations in performance. This may conserve valuable IPv4 resources, providing an interim solution until a full migration to IPv6 becomes more feasible. The UE/CPE provisioning 154 and the provisioning source of truth 156 components may ensure that these resource allocations are carried out effectively and consistently.

For example, the UE/CPE provisioning 154 component may operate as a provisioning manager to manage the automatic allocation of network resources to UE/CPE 102 devices and ensure that user client devices 104 quickly and efficiently obtain the appropriate resources. The UE/CPE provisioning 154 component may authenticate, authorize, and assign relevant networking parameters when a UE/CPE 102 component initiates a connection request.

The provisioning source of truth 156 component may be a centralized database that includes customer profiles and service entitlements and/or may operate as the central reference point to ensure consistency and accuracy in provisioning decisions. The provisioning source of truth 156 component may be configured to provide answers to queries that arise about a client device's 104 eligibility or any configuration-related issue. The provisioning source of truth 156 component may maintain a comprehensive and up-to-date database of provisioning policies, configurations, and subscriber entitlements, and may be configured to ensure that network resources are allocated judiciously.

The core/internet 162 components may include network components that create the vast expanse of interconnected networks known as the Internet 110. The core/internet 162 may be the ultimate destination for most of the data requests initiated by end-users. Whether a user client device 104 is streaming a video, browsing a webpage, or sending an email, the requested data typically traverses from this vast network through the service provider's infrastructure, eventually reaching the client device 104. Efficient interaction between DAA core 152 and core/internet 162 components may help ensure that users may access the limitless resources of the Internet with minimal delay and maximum efficiency.

The embodiments disclosed herein include components configured to permit service providers to maintain a consistently high level of service quality, even as they contend with escalating demands and the limitations of diminishing IPv4 address resources. These embodiments may use a CPE-centric single IPv4 NAPT functionality that is compatible with current network infrastructure components, such as DHCP servers and DAA nodes 122, as well as diverse access technology components 106. Such compatibility may be conducive to a less disruptive system deployment and/or may align with prevailing regulatory standards.

Figure 2:
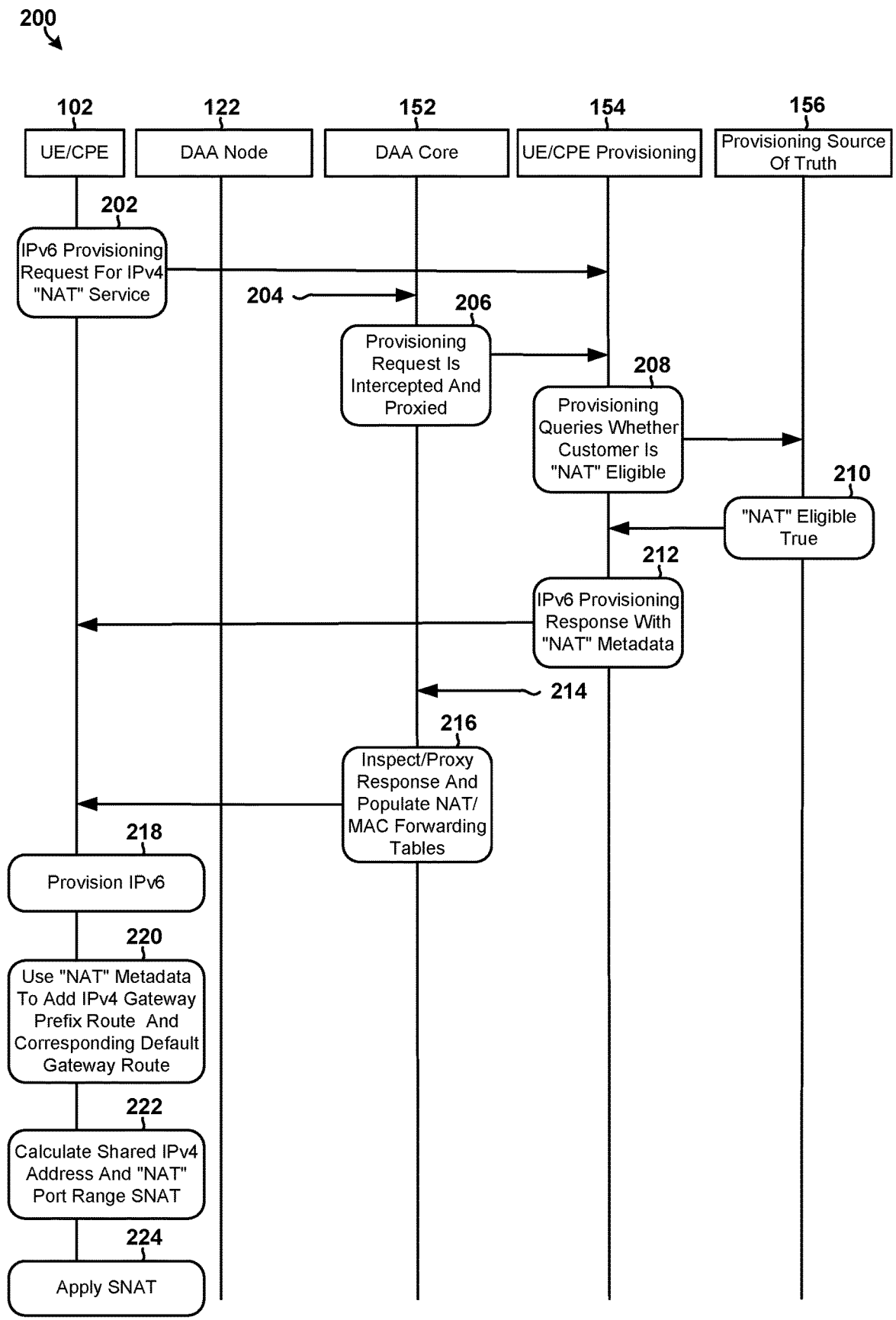
FIG. 2 is an activity diagram illustrating components and operations in a system configured to perform a control plane method of processing IPv4 NAT service requests and provisioning within a network in accordance with some embodiments.

FIG. 2 is a process flow diagram illustrating a control plane method 200 of processing IPv4 NAT service requests and provisioning within a network environment in accordance with some embodiments disclosed herein. The control plane method 200 outlines a process for handling IPv4 NAT service requests within a network environment that is based on IPv6 protocols. The method 200 may include a sequence of operations that may be initiated by the UE/CPE 102 component, which requests IPv4 NAT services through IPv6 protocols. The request for IPv4 NAT services through IPv6 protocols may then be intercepted and authenticated by the DAA core 152. Various checks and queries may be performed, including customer eligibility for NAT services, before the provisioning of IPv4 NAT service is successfully completed.

It should be understood that the complete control plane operation may be a combination of IPv6-based IPv4 NAT service request and response activities, along with IPv4 configuration and posture-setting tasks (sometimes referred to as provisioning) on both the DAA core 152 and the UE/CPE 102.

In operation 202, the UE/CPE 102 component may initiate the control plane method 200 by requesting IPv4 NAT service within a network environment that is based on IPv6 protocols from the UE/CPE provisioning 154 component.

In operation 204, the DAA core 152 may intercept the request, and then in operation 206, the DAA core 152 may perform authentication, and proxy the provisioning request to the UE/CPE provisioning 154. For example, the DAA core 152 may monitor the establishment and management of the communication sessions between the UE/CPE 102 and UE/CPE provisioning 154, which may include coordinating the initiation, maintenance, and termination of network connections in line with predefined rules. The intercepted request may be forwarded as is, or modified before reaching the UE/CPE provisioning 154 component.

In operation 208, the UE/CPE provisioning 154 component may query the provisioning source of truth 156 to determine customer eligibility for NAT service (e.g., based on subscription level, device compatibility, geographic location, etc.).

In operation 210, the provisioning source of truth 156 may send an affirmative response (i.e., NAT Eligible True) to the UE/CPE provisioning 154 component. For example, the provisioning source of truth 156 may determine that an associated customer is eligible for NAT service based subscription level, device compatibility, geographic location, etc. The affirmative response may include additional metadata, such as a timestamp or a unique identifier.

In response to receiving an affirmative response, in operation 212, the UE/CPE provisioning 154 may send an IPv6 provisioning response back to the UE/CPE 102. The IPv6 provisioning response may include NAT eligibility information and other metadata and parameters such as integer values for calculating port ranges, authentication tokens, timing configurations, preferred gateways within the IPv6 provisioning response, etc.

In operation 214, the DAA core 152 may evaluate the response, and in operation 216 relay/proxy the response, and update its NAT/MAC forwarding tables. For example, the DAA core 152 may evaluate the IPv6 provisioning response for metadata (e.g., algorithm integers and index integer that represent the port ranges, associated IP addresses, etc.) suitable for updating its NAT/MAC forwarding tables. By updating these tables, the DAA core 152 may have the requisite information to direct incoming and outgoing traffic to the appropriate end-users.

In operation 218, the UE/CPE 102 may provision its IPv6 settings, which may include configuring the device to effectively interact with the IPv6-enabled network infrastructure. For example, the UE/CPE 102 may automatically fetch its IPv6 address, IPv6 prefix, DNS settings, and other network parameters from the UE/CPE provisioning 154 component in response to receiving the IPv6 provisioning response. It should be noted that IPv6 gateway assignments are typically not handled via provisioning. Instead, local and remote IPv6 communications frequently depend on well-established methods such as DHCPv6 for address assignments and ICMPv6-based router advertisements for gateway announcements.

In some embodiments, the UE/CPE 102 may establish and apply firewall rules and security configurations in accordance with the IPv6 protocol, which may include enabling or disabling certain ports, establishing rules for packet filtering, or specifying the types of traffic that are allowed or disallowed, all within the realm of IPv6 communications. In some embodiments, the UE/CPE 102 may establish and apply IPv4 firewall rules.

In operation 220, the UE/CPE 102 may use the "NAT" metadata to add an IPv4 gateway prefix route. For example, upon receiving the IPv6 provisioning response that includes "NAT" metadata from the UE/CPE provisioning 154 component, the UE/CPE 102 may extract this metadata to understand the manner in which to appropriately route IPv4 traffic. The metadata may contain information such as the IPv4 Prefix and subnet mask for the gateway prefix route which may include the supplied IPv4 gateway address (also in the metadata but used separately to generate the default gateway route). The UE/CPE 102 may use this metadata to add a new entry to its routing table that directs all IPv4 traffic toward the specified gateway. In some embodiments, the metadata may identify priority routing for certain types of IPv4 traffic. For example, VoIP or streaming services might require more stable and faster routes, which could be indicated in the metadata.

In operation 222, the UE/CPE 102 may calculate its shared IPv4 address. In some embodiment, the UE/CPE 102 may calculate its shared IPv4 address based on the metadata obtained during the provisioning process from the UE/CPE provisioning 154 component and specific calculations using bits from the assigned IPv6 prefix. The metadata may include elements such as an embedded address bits length, an IPv6 rule prefix and its length, an IPv4 rule prefix and its length, a port set identifier offset, etc. The shared IPv4 address may allow multiple UE/CPE devices to share and use portions of a single IPv4 address by differentiating them based on port numbers or other identifiers. That is, by calculating its shared IPv4 address, the UE/CPE 102 may effectively share a finite resource without causing conflicts with other devices. This may also facilitate network scalability, as a single IPv4 address may be multiplexed to serve multiple end-users, while still maintaining a reasonable level of individuality and service quality for each user.

It should be understood that the UE/CPE 102 device may be assigned an IPv6 prefix that differs from the general rule prefix and/or that the assigned prefix may be contained within the IPv6 rule prefix. The assignment operations may include using a deliberate calculation based on specific bits within the assigned IPv6 prefix in addition to the metadata provided during the provisioning transaction. This calculation may identify indices that correlate to the IPv4 address and port sets to help ensure that each UE/CPE 102 device is equipped with a unique configuration.

It should also be understood that the IPv4 address and port set may be distinct and separate from the IPv6 rule prefix. The IPv4 address may be linked to or associated with the IPv6 prefix. For IPv4, a common practice is to assign a single IP address to a service-provider-facing router interface. In contrast, the IPv6 assignment may use a 128-bit integer to identify the indices for the IPv4 address derived from the rule prefix and additional configuration details.

It should be further understood that metadata may be used to determine the location of the specific bits within the IPv6 prefix that are used to retrieve the index values for the assignment.

In operation 224, the UE/CPE 102 may apply SNAT/NAPT as calculated by the above-described algorithm. It should be noted that NAPT is a specific form of SNAT that enables the sharing of a single IPv4 address across multiple devices, contrasting with 1-to-1 translation often seen in SNAT. In the context of CGN/LSN use cases, the form of SNAT used may be NAPT. In some embodiments, the UE/CPE 102 may alter the source address of its outgoing IPv4 traffic, effectively mapping it to the calculated shared IPv4 address based on the above-described algorithm. If the received metadata includes QoS parameters, the UE/CPE 102 may use SNAT rules that change the source address and set certain packet headers to levels defined in the QoS parameters to prioritize traffic as it traverses the network, ensuring the level of service quality is in line with the subscription or policy level of the user's client device 104.

Figure 3:
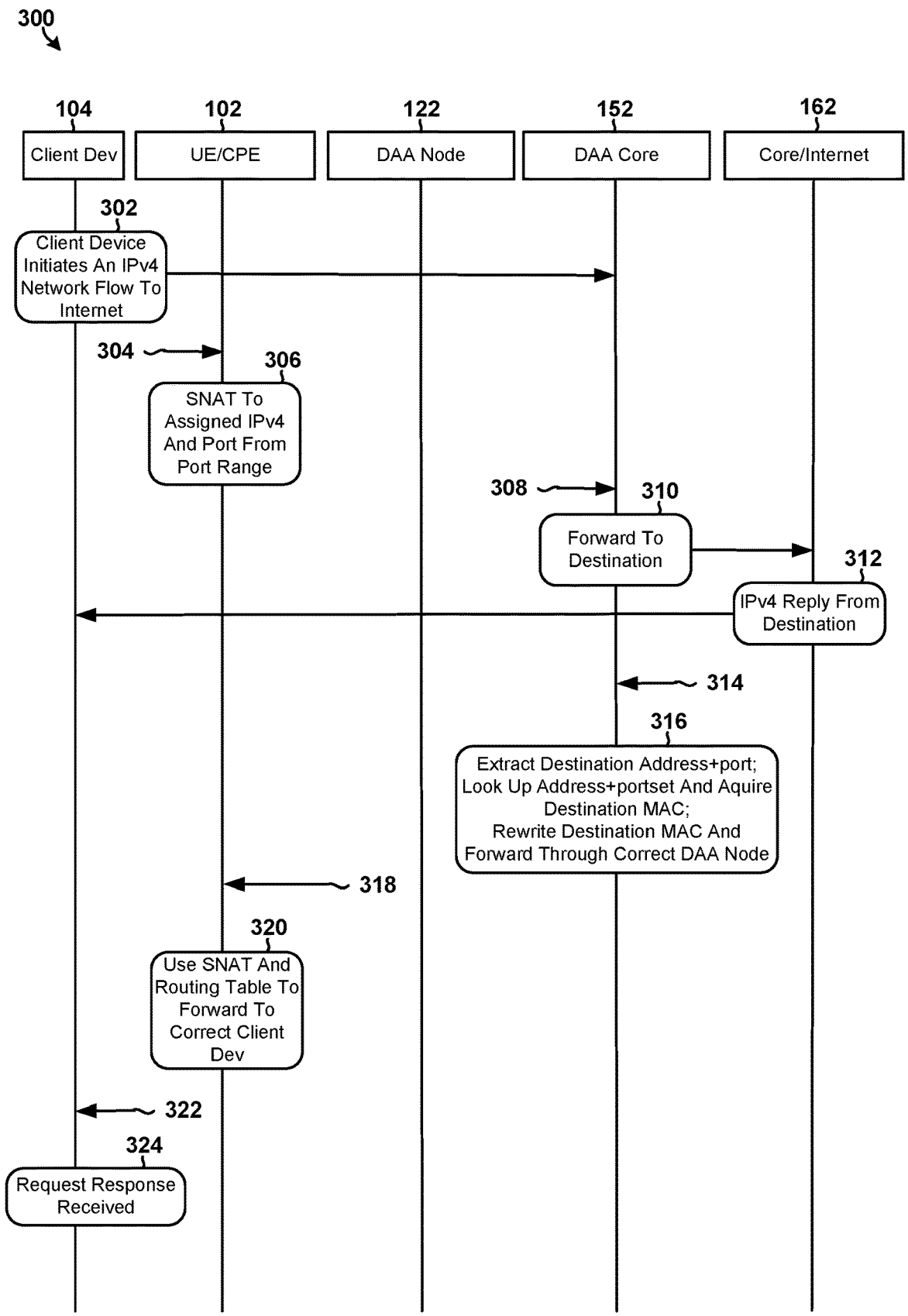
FIG. 3 is an activity diagram illustrating components and operations for a flow-based IPv4 NAT processing and traffic forwarding within a network in accordance with some embodiments.

FIG. 3 is a process flow diagram illustrating a data plane method 300 of processing IPv4 NAT service requests within a network in accordance with various embodiments disclosed herein.

In operation 302, the client device 104 may initiate an IPv4 network flow aimed at a destination on the Internet 110. In some embodiments, the client device 104 may initiate the IPv4 network flow by generating a data packet with the intended destination IP address and other relevant metadata. This data packet may be directed toward the UE/CPE 102 component. Depending on network topology, the packet may traverse through one or multiple networking layers before reaching UE/CPE 102 in operation 304.

In operation 306, the UE/CPE 102 may apply SNAT to the incoming data packet and use the assigned IPv4 address and port from the previously defined port range to transform the packet to conform to network policies and determine the correct routing. The SNAT-applied packet may be forwarded to the DAA core 152 component in operation 308, which may be responsible for additional layers of routing and forwarding as defined by network policies and routing tables.

In operation 310, the DAA core 152 may forward the data packet to the final destination over the Internet (Core/Internet 162), which may include traversing multiple network nodes and switches before reaching the intended destination.

In operation 312, the destination (Core/Internet 162) may send an IPv4 reply back to the client device 104. The IPv4 reply may include the requested data, acknowledgements, or other relevant information.

In operation 314, the reply packet may be directed back toward the DAA core 152. The reply packet may traverse the Internet and potentially other intermediary network nodes before reaching the DAA core 152.

In operation 316, the DAA core 152 may extract the destination address and port from the reply packet. The DAA core 152 may look up these details in its NAT/MAC table and/or implement a port mapping algorithm to acquire the appropriate destination MAC address. The DAA core 152 may rewrite the destination MAC address and forward the reply packet through the correct DAA node 122.

It should be understood that the DAA core 152 may be configured to look up certain network details without needing to acquire the destination MAC address from a MAC address table. The DAA core 152 may retrieve specific network information by directly extracting the destination address and port from a reply packet. The DAA core 152 may use a port mapping algorithm informed by metadata to determine the router's MAC address and determine the appropriate handling of the packet based on port data. The algorithm may use a predefined sequence of mask operations, as directed by the metadata, to interpret the destination port number. These operations may isolate and reveal the bits representing the port identifier within the packet's data. The port number itself may be part of a 16-bit integer that ranges from 0 to 65535. Metadata may instruct the algorithm on which specific bits of this 16-bit value are relevant for extracting the port identifier. These masking operations may allow the DAA core 152 to interpret the designated bits that make up the port identifier.

In operation 318, the modified reply packet may be sent back to the UE/CPE 102 component, which may include the packet traversing the network in reverse, guided by the DAA core 152 and its updated routing information.

In operation 320, the UE/CPE 102 may use its SNAT/NAPT table (which may be established as part of operation 306) and routing table to forward the packet to the correct client device, which may ensure that the response reaches the originating device and fulfills the initial request.

In operation 322, the processed packet may be forwarded to the client device 104.

In operation 324, the client device 104 may receive the response to its original request, unpack the received packet, and publish the enclosed data or information so that it is available for the client application to process.

The data plane method 300 described above may process IPv4 network traffic and provide NAT services. Data plane method 300 may commence with the initiation of an IPv4 network flow from a client device 104 to a destination on the Internet 110. The flow may undergo various transformations and routings via the UE/CPE 102 and DAA core 152 components that use SNAT settings and other network parameters to ensure the data packet is properly routed to its destination and back.

Generally, when a packet arrives at the DAA core 152, the system may take different actions based on the packet type. For IPv4 UDP/TCP non-fragment packets, the DAA core 152 may match the destination address to an IPv4 prefix table. The DAA core 152 may use address plus port (A+P) values and a port mapping algorithm to determine the router MAC, place it in the MAC destination, and use technology-specific mechanisms (e.g., XPON, DOCSIS, etc.) to forward the packet to the router. The router may access its NAPT state table to perform NAT operations and direct the packet to the correct originating device.

It should be understood that the above-described "IPv4 prefix table" may be "IPv4 NAT prefix table" that catalogs IPv4 prefixes known to be associated with NAT functionalities and that the above-described "IPv4 rule prefix" pertains to the IPv4 prefixes designated for NAT operations. The IPv4 prefix table may be used to differentiate the traffic or subscriber addresses that are NAT-eligible from those that are not. That is, the IPv4 prefix table may be used to determine whether an address should be processed through NAT procedures (including the MAC address rewrites) or handled via standard routing protocols. In some embodiments, the DAA core 152 may be configured to apply standard processing protocols without invoking NAT-specific processes in response to determining that an address is not included in the table.

For IPv4 ICMP echo reply packets, the DAA core 152 may execute steps similar to those for UDP/TCP packets, with the variation that it extracts and matches based on the ICMP echo reply identifier value. For IPv4 ICMP error packets, the DAA core 152 may match the ICMP error and extract the originating address. The matching may be based on the packet-in-error-port value of UDP/TCP or ICMP echo-request, with the goal of extracting the originating IPv4 address and port (or ICMPv4 identifier). For IPv4 UDP/TCP/ICMP fragment packets, the DAA core 152 may engage in specialized handling. For example, a stateful hash table may be created when the initial fragment is received, and fragments may undergo a unique sequence of operations in which non-initial fragments are buffered until the arrival of the initial fragment.

Figure 4A:
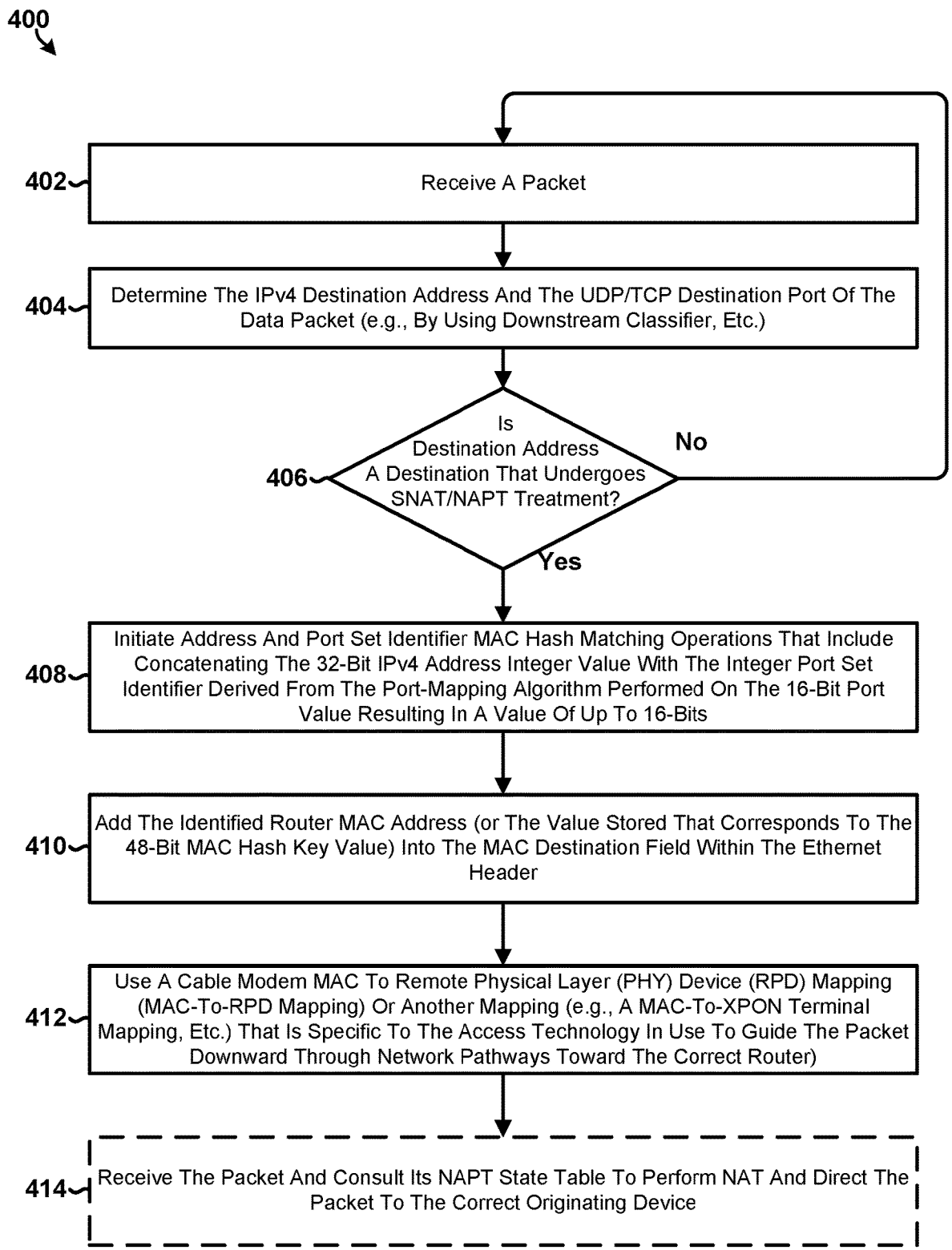
FIGS. 4A-4D are process flow diagrams illustrating downstream methods for handling various types of network traffic in accordance with some embodiments.
Figure 4B:
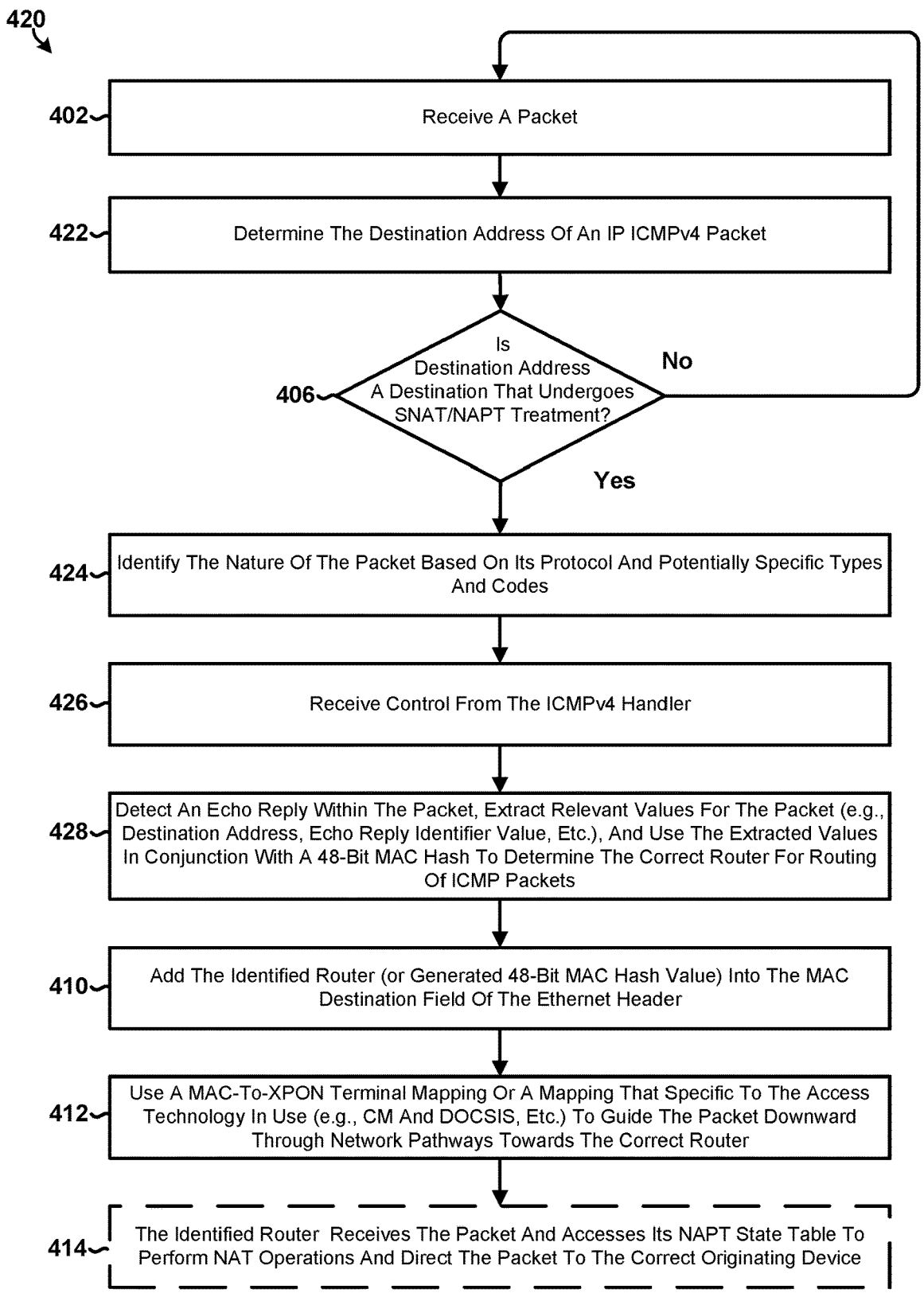
Figure 4C:
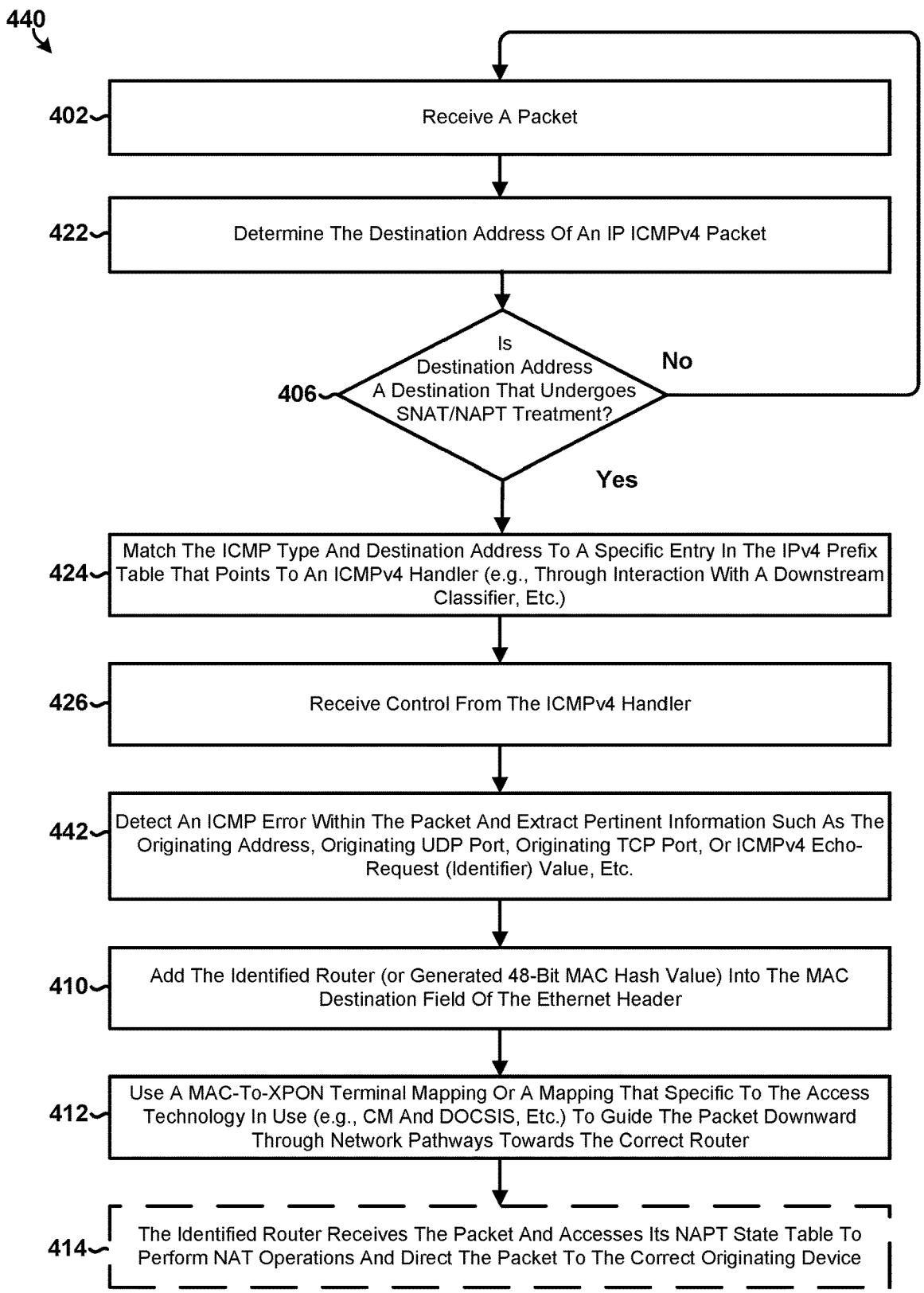
Figure 4D:
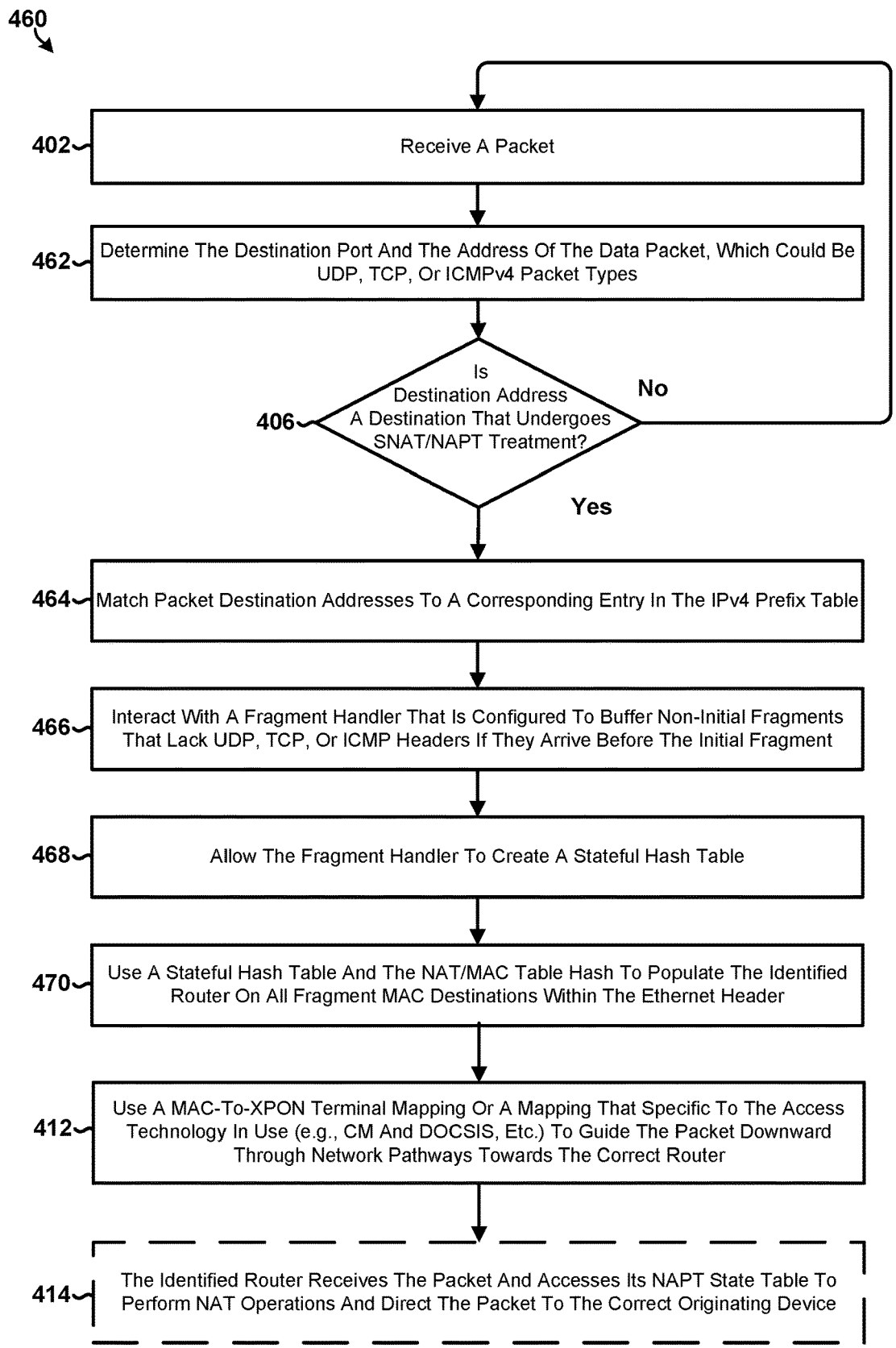

FIG. 4A-4D are process flow diagrams illustrating downstream methods 400, 420, 440, 460 for handling various types of IPv4 network traffic in accordance with some embodiments. In particular, FIG. 4A illustrates an example method 400 of streamlining the handling and forwarding of IPv4 UDP/TCP non-fragment packets by utilizing multiple layers of identification, classification, and specialized routing. FIG. 4B illustrates an example method 420 of streamlining the handling and forwarding of IPv4 ICMP echo replies. FIG. 4C illustrates an example method 440 of streamlining the handling and forwarding of IPv4 ICMP errors. FIG. 4D illustrates an example method 460 of streamlining the handling and forwarding of IPv4 UDP/TCP/ICMP fragments.

With reference to FIG. 4A, in block 402 the DAA core 152 may receive a data packet. The DAA core 152 may include a downstream classifier to facilitate the proper handling and routing of these incoming data packets. The downstream classifier may serve as an element that sorts or classifies incoming data packets according to predefined criteria, such as destination address or protocol type (UDP, TCP, ICMP, etc.). The use of a downstream classifier for initial data packet sorting based on various criteria may provide an additional level of granularity in data packet handling.

In block 404, the DAA core 152 may determine the IPv4 destination address and the UDP/TCP destination port of the data packet (e.g., by using downstream classifier, etc.).

In determination block 406, the DAA core 152 may determine whether the destination address is either a standard destination or a destination that undergoes SNAT/NAPT treatment. The DAA core 152 may identify known SNAT/NAPT destinations through metadata received during the provisioning phase or through static definitions in a configuration. If the destination is not an SNAT/NAPT type, the packet may be processed using conventional solutions. In some embodiments, the DAA core 152 may determine whether there is a corresponding prefix in the IPv4 prefix table in block 406. The IPv4 prefix table may be a data structure that serves to map or correlate IPv4 prefixes to various attributes or parameters that influence packet routing and handling. In some embodiments, the IPv4 prefix table may additionally include information indicating whether a given prefix corresponds to a destination that is subject to SNAT/NAPT treatment.

In response to determining that the destination address is a destination that undergoes SNAT/NAPT treatment (i.e., determination block 406="Yes"), the DAA core 152 may initiate address and port set identifier MAC hash matching operations in block 408 that include concatenating the 32-bit IPv4 address integer value with the integer (port set identifier) derived from the port-mapping algorithm performed on the 16-bit port value resulting in a value of up to 16-bits. The results may be used in block 408 to generate a key that corresponds to the appropriate router to which the data packets should be forwarded. In some embodiments, the DAA core 152 may use the downstream classifier to analyze the destination address and port of the data packet, matching it to an appropriate prefix in the IPv4 prefix table. This correspondence may initiate address and port set identifier to MAC hash matching activities aimed at matching the 48-bit MAC hash key and obtaining the contained CPE/router MAC address.

In response to determining that the destination address is a standard destination or that the destination address is not a destination that undergoes SNAT/NAPT treatment (i.e., determination block 406="No"), the DAA core 152 may perform conventional forwarding operations. It should be noted that such packets may be processed using normal forwarding behavior, independent of the methods outlined in this description. The DAA core 152 may then return to operation 402 to await the receipt of the next data packet.

In block 410, the DAA core 152 may add the identified router MAC address (or the value stored that corresponds to the 48-bit MAC hash key value) into the MAC destination field within the Ethernet header. Thus, the identified router MAC address becomes the MAC destination in the Ethernet header. By setting the MAC value stored in the matching 48-bit MAC hash key as the destination in the Ethernet header, the DAA core 152 may provide the packet with the necessary information to be properly guided through network switches and other intermediary devices on its path toward router that owns the specific address and range of ports.

In block 412, the DAA core 152 may use a cable modem MAC to Remote Physical Layer (PHY) Device (RPD) mapping (MAC-to-RPD mapping) or another mapping (e.g., a MAC-to-XPON terminal mapping, etc.) that is specific to the access technology in use to guide the packet downward through network pathways toward the correct router). The MAC-to-RPD mapping may be a specialized mapping between MAC addresses and destination RPDs in a DOCSIS system. The DAA core 152 may use this mapping data to steer the packet through suitable network channels (e.g., by determining the RPD that aligns with the identified router, etc.). It should be understood that while DOCSIS is used as an illustrative network technology in the example above, the DAA core 152 is not limited to any one network technology and could adapt various other technology-specific logic, such as those relevant to XPON systems. The technology-specific logic (e.g., MAC to destination RPD mapping, etc.) may help ensure compatibility with different network architectures.

In block 414, the identified router may optionally receive the packet and consult its NAPT state table to perform NAT and direct the packet to the correct originating device. For example, the router may extract information such as the destination IP address and port number from the received packet, query NAPT state table for an entry matching the extracted information, modify the destination IP and port information in the packet header according to the NAPT entry in response to determining that the NAPT state table includes an entry matching the extracted information, and send the modified packet along a specific internal network path that leads to the originating device.

With reference to FIG. 4B, in block 402 the processing system (e.g., in the DAA core 152, etc.) may perform the operations discussed above with reference to block 402 in FIG. 4A. In block 422, the DAA core 152 may determine the destination address of an IP ICMPv4 packet. In block 406 the processing system may perform the operations discussed above with reference to block 406 in FIG. 4A.

In block 424, the DAA core 152 may (e.g., through interaction with a downstream classifier, etc.) identify the nature of the packet based on its protocol and potentially specific types and codes. If the protocol is determined to be ICMPv4, and particularly if the type and code match certain predefined criteria (e.g., Type 0, Code 0), the packet may be directed to an ICMP handler for further processing. The ICMP type is a part of the ICMP header and is used to specify the kind of message being sent, whereas the IPv4 prefix table may be used to whether the destination address is intended for SNAT/NAPT treatment. The operations in block 424 may categorize the packet as either UDP/TCP non-fragmented, ICMPv4, or a fragment. Based on this categorization, the DAA core 152 may determine the appropriate function to invoke for MAC address rewriting. For example, for ICMPv4 non-fragment packets, the entire packet may be handed off to the ICMPv4 handler for subsequent processing.

In block 426, the DAA core 152 may receive a control message/signal from the ICMPv4 handler.

In block 428 the DAA core 152 may detect an echo reply within the packet, extract relevant values for the packet (e.g., destination address, echo reply identifier value, etc.), and use the extracted values in conjunction with a 48-bit MAC hash to determine the correct router for routing of ICMP packets. For example, the extracted values may be used to generate a MAC hash 48-bit key value which may be matched to obtain the value consisting of the desired router MAC address.

In blocks 410, 412, and 414 the processing system may perform the operations discussed above with reference to blocks 410, 412, and 414 in FIG. 4A.

With reference to FIG. 4C, in blocks 402, 422, 406, 424, and 426, the processing system may perform the operations discussed above with reference to blocks 402, 422, 406, 424, and 426 in FIGS. 4A and 4B. In block 442, the processing system may detect an ICMP error within the packet and extract pertinent information such as the originating address, originating UDP port, originating TCP port, or ICMPv4 echo-request (identifier) value, etc. The extracted information may be used to match 48 bits in MAC hash to determine the correct router. In blocks 410, 412, and 414 the processing system may perform the operations discussed above with reference to blocks 410, 412, and 414 in FIG. 4A.

With reference to FIG. 4D, in block 402 the processing system may perform the operations discussed above with reference to block 402 in FIG. 4A. In block 462, the DAA core 152 may determine the destination port and the address of the data packet, which could be UDP, TCP, or ICMPv4 packet types (e.g., by using downstream classifier, etc.). In block 404 the processing system may perform the operations discussed above with reference to block 404 in FIG. 4A.

In block 464, the DAA core 152 may (e.g., through interaction with a downstream classifier, etc.) match packet destination addresses to a corresponding entry in the IPv4 prefix table.

In block 466, the DAA core 152 may interact with a fragment handler that is configured to buffer non-initial fragments that lack UDP, TCP, or ICMP headers if they arrive before the initial fragment.

In block 468, the DAA core 152 may enable the fragment handler to create a stateful hash table. The hash table may include attributes such as IP destination, IP source, protocol type, and fragment ID and may map these to a 48-bit address and port set identifier value extracted from the initial fragment.

In block 470, the DAA core 152 may use a stateful hash table and the NAT/MAC table hash to populate the identified router on all fragment MAC destinations within the Ethernet header.

In blocks 412 and 414 the processing system may perform the operations discussed above with reference to blocks 412 and 414 in FIG. 4A.

In some embodiments, the DAA core 152 may be configured to detect the arrival of IPv4 packets and perform high-level forwarding operations that include forwarding the packet to the service provider network via regular processing methods in response to determining the destination of an IPv4 packet is not associated with this specific DAA core 152 (the applicable DAA core). For example, the router may perform source NAT using assigned port ranges, and the upstream classifier may not match the destination prefix in the IPv4 prefix table.

In some embodiments, the DAA core 152 may be configured to identify incoming IPv4 packets whose destination addresses are directly attached and switch to performing operations similar to the downstream operations. For example, the DAA core 152 may query the IPv4 prefix table to match the destination prefix of the incoming packet, use A+P values and a port mapping algorithm to determine the MAC address of the router that should ultimately receive the packet, insert the determined MAC address into the destination field of the packet's Ethernet header, and use technology-specific mechanisms to forward the packet towards the correctly identified router. In some embodiments, the DAA core 152 may keep track of this special handling and update internal state tables for future packet forwarding decisions to these attached devices.

Figure 5A:
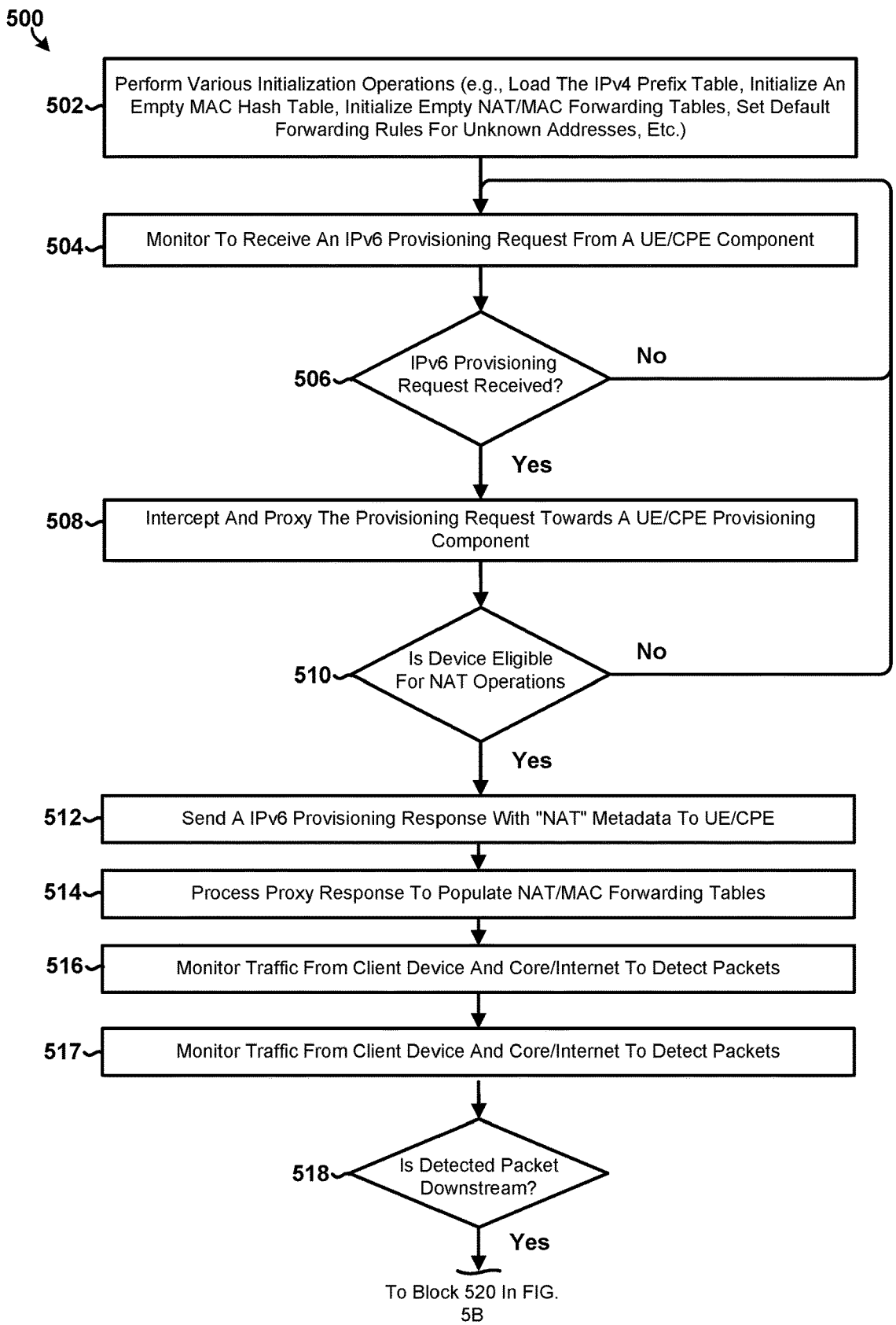
FIGS. 5A and 5B are process flow diagrams illustrating a method of implementing network address port translation using stateless MAC rewrite in a distributed access architecture core environment in accordance with some embodiments.
Figure 5B:
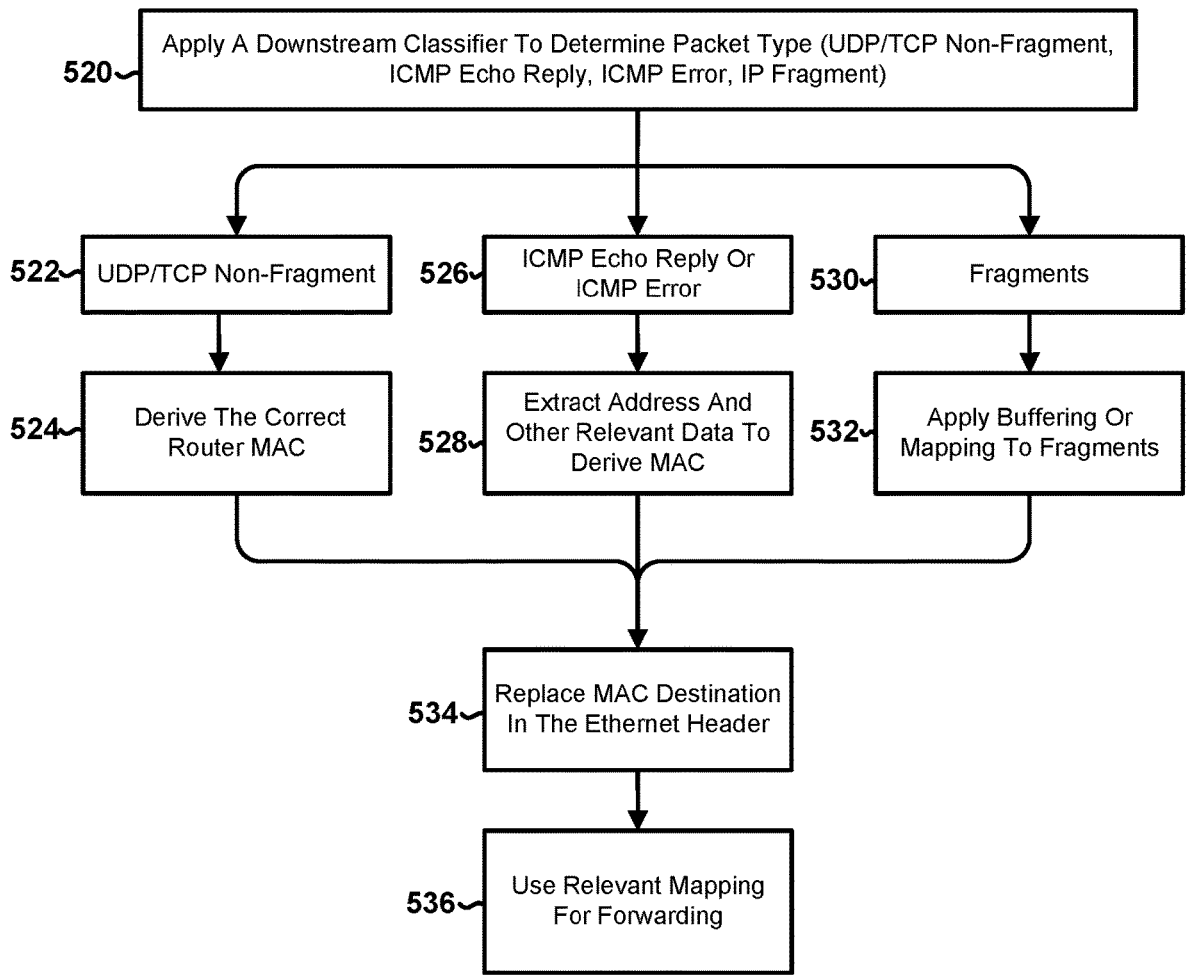

FIGS. 5A and 5B are process flow diagrams illustrating a method 500 of implementing network address port translation using stateless MAC rewrite in a distributed access architecture core environment in accordance with some embodiments. With reference to FIGS. 1-5, the method 500 may be performed in a computing device by a processing system encompassing one or more processors, components (e.g., DAA core 152, etc.) or subsystems discussed in this application. Means for performing the functions of the operations in the method 500 may include a processing system including one or more of processors and other components (e.g., computing device 600) described herein. Further, one or more processors of a processing system may be configured with software or firmware to perform some or all of the operations of the method 500. In order to encompass the alternative configurations enabled in various embodiments, the hardware implementing any or all of the method 500 is referred to herein as a "processing system."

With reference to FIG. 5A, in block 502, the processing system may perform various initialization operations, such as loading the IPv4 prefix table, setting default forwarding rules for unknown addresses, etc.

In block 504, the processing system may monitor to receive an IPv6 provisioning request from a UE/CPE component.

In determination block 506, the processing system may determine whether an IPv6 provisioning request from the UE/CPE component was detected.

In response to not detecting a provisioning request (i.e., determination block 506="No"), the processing system may return to block 504 to monitor to receive an IPv6 provisioning request from a UE/CPE component. In response to detecting a provisioning request (i.e., determination block 506="Yes"), the processing system may intercept and proxy the provisioning request towards a UE/CPE provisioning component in block 508.

In determination block 510, the processing system may retrieve the "NAT eligibility" from the provisioning source of truth component and determine whether the device is eligible for NAT operations.

In response to determining that the device is not eligible for NAT operations (i.e., determination block 510="No"), the processing system may return to block 504 to monitor to receive an IPv6 provisioning request from a UE/CPE component. In response to determine that the device is eligible for NAT operations (i.e., determination block 510="Yes"), the processing system may send an IPv6 provisioning response with "NAT" metadata to UE/CPE in block 512.

In block 514, the processing system may process the proxy response to populate NAT/MAC forwarding tables.

In block 516, the processing system may monitor traffic from the client device and core/Internet to detect data packets. In some embodiments, the processing system may compare the detected data packets to an IPv4 prefix table to determine whether they are directed to an attached NAT destination.

In blocks 517 and/or 518, the processing system may (e.g., by using the downstream classifier, etc.) identify the address and destination port for any UDP/TCP non-fragment packets and determine whether the detected data packets are downstream packets.

With reference to FIG. 5B, in response to determining that the detected packets are downstream packets (i.e., determination block 518="Yes"), the processing system may apply a downstream classifier to determine packet type (UDP/TCP non-fragment, ICMP echo reply, ICMP error, IP fragment) in block 520.

In response to determining that the packet type is UDP/TCP non-fragment in block 522, the processing system may access and use a NAT/MAC forwarding table that includes a 48-bit key, which may be a concatenated value including a 32-bit IPv4 address and up to a 16-bit port set identifier. The length in bits of the port set identifier may be determined by the sharing ratio of the SNAT/NAPT. For example, a sharing ratio of 2:1 may require a single bit for the port set identifier, while a 16:1 sharing ratio may require 4 bits. Any preceding bits in the port set identifier may be padded with zeros. The system may use this 48-bit key to find the corresponding MAC address for correct routing in block 524, replace MAC destination in the Ethernet header in block 534, and use the relevant mapping (e.g., MAC to destination XPON terminal mapping, etc.) for forwarding in block 536.

In response to determining that the packet type is ICMP echo reply or ICMP error in block 526, the processing system may extract address and other relevant data, replace MAC destination in the Ethernet header in block 534, and use the relevant mapping (e.g., MAC to destination XPON terminal mapping, etc.) for forwarding in block 536.

In response to determining the packet type is fragments in block 530, the processing system may access and use a NAT/MAC forwarding table that includes the above-described 48-bit key (e.g., 32-bit IPv4 address and up to a 16-bit port set identifier) to find the corresponding MAC address for correct routing, apply buffering or mapping to handle fragments appropriately in block 532, replace MAC destination in the Ethernet header in block 534, and use relevant mapping for forwarding in block 536.

That is, if the initial fragment (which includes header information such as TCP, UDP, or ICMP identifiers, etc.) arrives first, the system may directly apply the necessary processing. On the other hand, if the initial fragment is not the first to arrive, the system may buffer the fragments and wait for the arrival of the initial fragment to obtain the port information or identifiers. After receiving the initial fragment, the processing system may access and use the NAT/MAC forwarding table that includes a 48-bit key (a 32-bit IPv4 address coupled with up to a 16-bit port set identifier) to determine the corresponding MAC address, etc. The processing system may then replace the MAC destination in the Ethernet header as indicated in block 534. For any subsequent fragments lacking the port information, the processing system may reference the initial fragment's details, now stored in a table, to facilitate proper mapping and forwarding as indicated in blocks 532 and 536.

In some embodiments, the processing system may be configured to generate, update, access, and/or use an ephemeral table as a temporary storage structure for handling fragments. The processing system may generate and use the ephemeral table to record important initial packet fragment information (e.g., port numbers and identifiers, etc.) along with the source and destination addresses, the protocol used, a unique fragment identifier, etc. These values may serve as key values for the table entries. The processing system may use this information to calculate the corresponding 48-bit key after the initial fragment's data is extracted and stored in the ephemeral table and determine the correct MAC address for rewriting packet headers to ensure proper routing. As subsequent fragments arrive that do not contain the complete port and identifier information (i.e., since only the initial fragment contains the packet's header with this information) the system references the ephemeral table using the values it does have (e.g., source and destination addresses, protocol, and fragment identifier) to perform the necessary operations (e.g., MAC rewrite, etc.). The ephemeral table may be discarded after the fragments have been fully processed (e.g., indicated by a timeout value, the reception of the final fragment, etc.), clearing the way for the system to handle new packet fragments and build new tables as needed.

Some embodiments may include a method for managing network traffic, that includes initiating, by a processor in a subscriber router, a dynamic host configuration protocol version 6 (DHCPv6) transaction to request network configuration information from a distributed access architecture (DAA) core, receiving a DHCPv6 response from the DAA core 152, the response containing IPv6 provisioning parameters and RFC 7598 rule data adapted to include additional metadata, determining an IPv4 address for the subscriber router based on the received IPv6 provisioning parameters, optionally determining whether to bind the calculated IPv4 address to a core-facing interface of the subscriber router or only use within the SNAT, determining an IPv4 gateway prefix route and default gateway address for forwarding traffic based on the received RFC 7598 rule data, associating the computed IPv4 gateway prefix route with the core-facing interface, determining an allowed range of source ports for network address and port translation (NAPT) based on the received IPv6 provisioning parameters, and applying the determined range of source ports for NAPT operations on the calculated IPv4 address.

For downstream traffic, the DAA core 152 component may perform a matching operation based on the address and port set identifier value that results in a MAC address rewrite to direct the packet to the intended subscriber. For upstream traffic that is an attached SNAT endpoint and the routing table is not used, the DAA core 152 may use a NAT/MAC forwarding table that includes entries that map specific address and port set identifier combinations to respective MAC addresses for forwarding the packet to its destination. The above methods may mitigate the technical limitations of centralized NAT functions in the DAA core 152, enhance scalability by relocating NAT tasks to the subscriber router, and accommodate both IPv4 and IPv6 protocols.

In some embodiments, the processing system (DAA core 152) may be configured to initiate a series of DHCPv6 provisioning operations following an initial request from a router (herein "router A1"). Specifically, the router (i.e., router A1) might initiate this sequence by dispatching a DHCPv6 Solicit message to request configuration information. This message may be directed to a DHCPv6 server, which could either be integrated within or affiliated with the DAA core 152. The DAA core 152 may activate its own DHCPv6 server component or assign the task to an allied DHCPv6 server entity. In response to receiving the DHCPv6 Solicit message, the DAA core 152 or its delegated DHCPv6 server may evaluate the message, generate a DHCPv6 advertise message that includes various configuration choices (e.g., IPv6 address prefix, additional metadata, etc.), and send the DHCPv6 advertise message back to the router (i.e., router A1). In response, the router may issue a DHCPv6 request message to affirm its intent to employ the options specified in the advertisement message. In response, the DAA core 152 may finalize the provisioning process by sending a DHCPv6 reply message back to the router. The DHCPv6 reply message may include finalized configuration elements, such as a unique IPv6 address, an IPv6 prefix, and supplementary metadata (which may include data that is similar to or adapted from RFC 7598 data such as rule data.) to construct shared IPv4 addresses and port numbers.

In some embodiments, the DAA core 152 may be configured to update internal tables, including the IPv4 prefix table and the address and port set identifier to MAC hash table (or NAT/MAC table) consistent with the data validated in the finalized DHCPv6 transaction.

In some embodiments, the DAA core 152 may be configured to initiate the same or similar series of DHCPv6 provisioning operations following an initial request from other routers (e.g., herein "router A2" and "router A3"), providing them with IPv6 address prefixes and additional metadata.

In some embodiments, the DAA core 152 may be configured to update its IPv4 prefix table based on DHCPv6 provisioning responses for the router (i.e., router A1), which may include RFC 7598 rule 89, 93-like data.

In some embodiments, the DAA core 152 may be configured to update its IPv4 prefix table and the NAT/MAC table hash based on data from the DHCPv6 transactions for routers A2 and A3.

In some embodiments, the DAA core 152 may be configured to DAA core 152 may allow routers (e.g., routers, etc.) to bind calculated IPv4 addresses to their core-facing interfaces based on data from their DHCPv6 transaction responses. For example, the DAA core 152 may provide each of the routers with configuration details (e.g., a unique IPv6 prefix, IPv6 address, and other relevant metadata) during the DHCPv6 provisioning operations. The metadata may include information that allows the routers to determine their IPv4 addresses. Binding these IPv4 addresses to the core-facing interfaces of the routers may establish an identifiable point of presence for each router in an IPv4 network, allowing them to participate in IPv4 routing. After the IPv4 addresses are bound to the core-facing interfaces of the routers, they may communicate with both IPv4 and IPv6 networks more efficiently.

In some embodiments, any or all of the routers may not bind calculated IPv4 addresses to their core-facing interfaces. In some embodiments, the address may be configured as part of the SNAT (described below with reference to block 518). Thus, the address may be bound directly on the interface or the interface may be left without an address. In the latter case, the address and port range may only occur in the SNAT.

In some embodiments, the DAA core 152 may be configured to assist routers by conveying IPv4 gateway prefix routes (e.g., through to their core-facing interfaces, etc.). A gateway prefix route may be a route bound to the provider facing interface (towards the DAA core). The default route may be an address contained within the gateway prefix route that is the next layer-3 address hop. This may help the router obtain the MAC address of the next layer-3 address hop. The gateway prefix routes may be explicitly provided to the routers via DHCPv6 provisioning operations or other suitable configuration protocols. Once this information is received, the routers may bind these gateway prefix routes to their core-facing interfaces.

It should be understood that, unlike conventional network configurations, the service provider-facing interface of the router is not simply assigned a unique IP address. Unlike conventional solutions, the default route (represented by the address 0.0.0.0/0) is set up with a next-hop address that leads to the DAA core 152 without assigning a specific IP address to the service provider-facing interface. This allows for efficient address resolution and routing from layer 2 to layer 3, avoiding IP address tracking, potential conflicts, and the need for maintaining unique IP addresses and routing support for the service provider interface.

In some embodiments, the DAA core 152 may be configured to assist routers in calculating and applying allowed port ranges for source NAT on their respective interfaces based on data derived from their DHCPv6 transaction responses. For example, the DAA core 152 DHCPv6 provisioning operations may yield a variety of configuration details for routers, including metadata that guides the calculation of allowed address and port ranges for SNAT, which is a mechanism used in routing to modify the source address information in outgoing packet headers allowing multiple devices to share a single public IP address. By providing each router with specific port ranges, the DAA core 152 effectively manages the limited resources of available ports. This may prevent port conflicts and/or may aid in resource allocation. Allocating specific port ranges may also enhance security by limiting the exposure of internal network details, making it more challenging for malicious actors to identify and exploit individual internal addresses.

Figure 6:
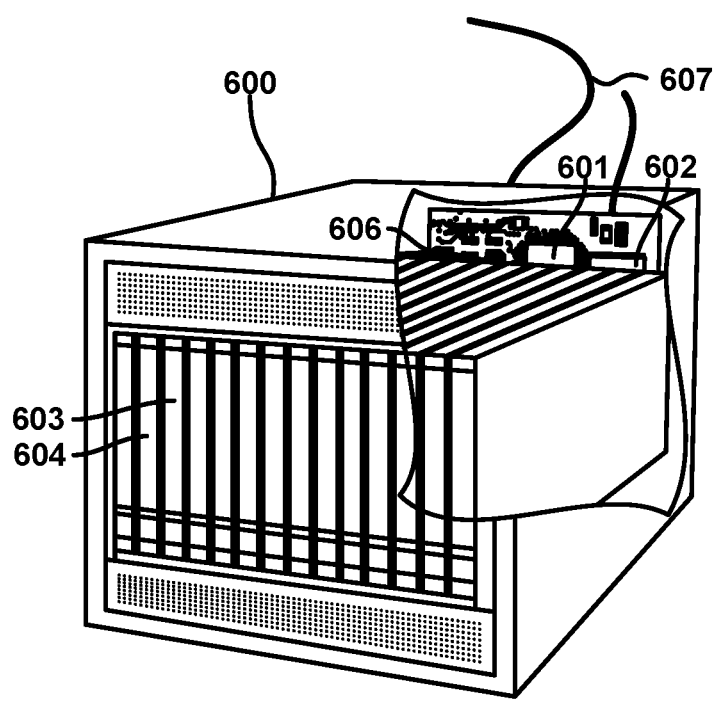
FIG. 6 is a component diagram of an example server suitable for implementing various embodiments disclosed herein.

FIG. 6 is a component block diagram of a computing device 600 suitable for use with various embodiments. With reference to FIGS. 1-6, various embodiments may be implemented on a variety of computing devices 600, an example of which is illustrated in FIG. 6 in the form of a server. The computing device 600 may include a processor 601 coupled to volatile memory 602 and a large capacity nonvolatile memory, such as a disk drive 603. The server device 600 may also include a floppy disc drive 604, USB, etc. coupled to the processor 601. The server device 600 may also include network access ports 606 coupled to the processor 601 for establishing data connections with a network connection circuit 606 and a communication network 607 (e.g., an Internet protocol (IP) network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method performed by a processing system in an access termination component in a service provider network for managing network traffic, including receiving, by the processing system, dynamic host configuration protocol version 6 (DHCPv6) solicit messages from one or more customer premise devices (CPEs) seeking network configuration information, transmitting, by the processing system, DHCPv6 provisioning responses to the one or more CPEs, each DHCPv6 provisioning response including IPv6 provisioning parameters, updating, by the processing system, an IPv4 prefix table with IPv4 prefixes, the IPv4 prefix table storing information related to networks that share IPv4 addresses, determining, by the processing system, a 48-bit address and port set identifier value and a corresponding media access control (MAC) address, and adding, by the processing system, the determined 48-bit address and port set identifier value and the corresponding MAC address into an address and port set identifier to MAC hash table.

Example 2: The method of example 1, further including receiving IPv4 packets and determining whether the destination address of a received IPv4 packet corresponds to a local source network address translation (SNAT)/network address and port translation (NAPT) endpoint.

Example 3: The method of any of the examples 1 and 2, further including receiving IPv4 packets and determining whether the received IPv4 packets are downstream packets or upstream packets.

Example 4: The method of any of the examples 1-3, further including in response to determining that the received IPv4 packets are downstream packets determining whether the received packets match an entry in the address and port set identifier to MAC hash table, and rewriting a header in the received packets to direct the packets to a CPE with the corresponding MAC address.

Example 5: The method of any of the examples 1-4, further including intercepting and proxying a provisioning request.

Example 6: A method for managing network traffic, including initiating, by a processor in a subscriber customer premise device (CPE), a dynamic host configuration protocol version 6 (DHCPv6) transaction to request network configuration information from an access termination component, receiving a DHCPv6 response from the access termination component, the response including IPv6 provisioning parameters and augmented RFC 7598 rule data, determining an IPv4 address for the subscriber CPE based on the received IPv6 provisioning parameters, determining an IPv4 gateway prefix route and default gateway address for forwarding traffic based on the augmented RFC 7598 rule data, associating the computed IPv4 gateway prefix route with the core-facing interface, determining an allowed range of source ports for network address and port translation (NAPT) based on the received IPv6 provisioning parameters, and applying the determined range of source ports for NAPT operations on the determined IPv4 address.

Example 7: The method of example 6, further including determining whether to bind the determined IPv4 address to a core-facing interface of the subscriber CPE or use the determined IPv4 address exclusively within Source Network Address Translation (SNAT) operations.

As used in this application, terminology such as "component," "module," "system," etc., is intended to encompass a computer-related entity. These entities may involve, among other possibilities, hardware, firmware, a blend of hardware and software, software alone, or software in an operational state. As examples, a component may encompass a running process on a processor, the processor itself, an object, an executable file, a thread of execution, a program, or a computing device. To illustrate further, both an application operating on a computing device and the computing device itself may be designated as a component. A component might be situated within a single process or thread of execution or could be distributed across multiple processors or cores. In addition, these components may operate based on various non-volatile computer-readable media that store diverse instructions and/or data structures. Communication between components may take place through local or remote processes, function or procedure calls, electronic signaling, data packet exchanges, memory interactions, among other known methods of network, computer, processor, or process-related communications.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processing system in an access termination component in a service provider network for managing network traffic, the method comprising:
   receiving, by the processing system, dynamic host configuration protocol version 6 (DHCPv6) solicit messages from one or more customer premise devices (CPEs) seeking network configuration information;
   transmitting, by the processing system, DHCPv6 provisioning responses to the one or more CPEs, each DHCPv6 provisioning response comprising IPv6 provisioning parameters;
   updating, by the processing system, an IPv4 prefix table with IPv4 prefixes, the IPv4 prefix table storing information related to networks that share IPv4 addresses;
   determining, by the processing system, a 48-bit address and port set identifier value and a corresponding media access control (MAC) address; and
   adding, by the processing system, the determined 48-bit address and port set identifier value and the corresponding MAC address into an address and port set identifier to MAC hash table.

2. The method of claim 1, further comprising:
   receiving IPv4 packets; and
   determining whether the destination address of a received IPv4 packet corresponds to a local source network address translation (SNAT)/network address and port translation (NAPT) endpoint.

3. The method of claim 1, further comprising:
   receiving IPv4 packets; and
   determining whether the received IPv4 packets are downstream packets or upstream packets.

4. The method of claim 3, further comprising in response to determining that the received IPv4 packets are downstream packets:
   determining whether the received packets match an entry in the address and port set identifier to MAC hash table; and
   rewriting a header in the received packets to direct the packets to a CPE with the corresponding MAC address.

5. The method of claim 1, further comprising intercepting and proxying a provisioning request.

6. A method for managing network traffic, comprising:
   initiating, by a processor in a subscriber customer premise device (CPE), a dynamic host configuration protocol version 6 (DHCPv6) transaction to request network configuration information from an access termination component;
   receiving a DHCPv6 response from the access termination component, the response including IPv6 provisioning parameters and augmented RFC 7598 rule data;
   determining an IPv4 address for the subscriber CPE based on the received IPv6 provisioning parameters;
   determining an IPv4 gateway prefix route and default gateway address for forwarding traffic based on the augmented RFC 7598 rule data;
   associating the computed IPv4 gateway prefix route with the core-facing interface;
   determining an allowed range of source ports for network address and port translation (NAPT) based on the received IPv6 provisioning parameters; and
   applying the determined range of source ports for NAPT operations on the determined IPv4 address.

7. The method of claim 6, further comprising determining whether to bind the determined IPv4 address to a core-facing interface of the subscriber CPE or use the determined IPv4 address exclusively within Source Network Address Translation (SNAT) operations.

8. A computing device, comprising:
   a processing system configured to:
      receive dynamic host configuration protocol version 6 (DHCPv6) solicit messages from one or more customer premise devices (CPEs) seeking network configuration information;

transmit DHCPv6 provisioning responses to the one or more CPEs, each DHCPv6 provisioning response comprising IPv6 provisioning parameters;

update an IPv4 prefix table with IPv4 prefixes, the IPv4 prefix table storing information related to networks that share IPv4 addresses;

determine a 48-bit address and port set identifier value and a corresponding media access control (MAC) address; and add the determined 48-bit address and port set identifier value and the corresponding MAC address into an address and port set identifier to MAC hash table.

9. The computing device of claim 8, wherein the processing system is further configured to:

receive IPv4 packets; and determine whether the destination address of a received IPv4 packet corresponds to a local source network address translation (SNAT)/network address and port translation (NAPT) endpoint.

10. The computing device of claim 8, wherein the processing system is further configured to:

receive IPv4 packets; and determine whether the received IPv4 packets are downstream packets or upstream packets.

11. The computing device of claim 10, wherein the processing system is further configured to:

in response to determining that the received IPv4 packets are downstream packets:

determine whether the received packets match an entry in the address and port set identifier to MAC hash table; and rewrite a header in the received packets to direct the packets to a CPE with the corresponding MAC address.

12. The computing device of claim 8, wherein the processing system is further configured to intercept and proxy a provisioning request.

13. A customer premise device (CPE), comprising:

a processing system configured to:

initiate a dynamic host configuration protocol version 6 (DHCPv6) transaction to request network configuration information from an access termination component;

receive a DHCPv6 response from the access termination component, the response including IPv6 provisioning parameters and augmented RFC 7598 rule data;

determine an IPv4 address for the subscriber CPE based on the received IPv6 provisioning parameters;

determine an IPv4 gateway prefix route and default gateway address for forwarding traffic based on the augmented RFC 7598 rule data;

associate the computed IPv4 gateway prefix route with the core-facing interface;

determine an allowed range of source ports for network address and port translation (NAPT) based on the received IPv6 provisioning parameters; and apply the determined range of source ports for NAPT operations on the determined IPv4 address.

14. The CPE of claim 13, wherein the processing system is further configured to determine whether to bind the determined IPv4 address to a core-facing interface of the subscriber CPE or use the determined IPv4 address exclusively within Source Network Address Translation (SNAT) operations.

15. A non-transitory processor readable media having stored thereon processor-executable instructions configured to cause a processing system in an access termination component in a service provider network perform operations for managing network traffic, the operations comprising:

receiving dynamic host configuration protocol version 6 (DHCPv6) solicit messages from one or more customer premise devices (CPEs) seeking network configuration information;

transmitting DHCPv6 provisioning responses to the one or more CPEs, each DHCPv6 provisioning response comprising IPv6 provisioning parameters;

updating an IPv4 prefix table with IPv4 prefixes, the IPv4 prefix table storing information related to networks that share IPv4 addresses;

determining a 48-bit address and port set identifier value and a corresponding media access control (MAC) address; and adding the determined 48-bit address and port set identifier value and the corresponding MAC address into an address and port set identifier to MAC hash table.

16. The non-transitory processor readable media of claim 15, wherein the stored processor-executable instructions are configured to cause the processing system to perform operations further comprising:

receiving IPv4 packets; and determining whether the destination address of a received IPv4 packet corresponds to a local source network address translation (SNAT)/network address and port translation (NAPT) endpoint.

17. The non-transitory processor readable media of claim 15, wherein the stored processor-executable instructions are configured to cause the processing system to perform operations further comprising:

receiving IPv4 packets; and determining whether the received IPv4 packets are downstream packets or upstream packets.

18. The non-transitory processor readable media of claim 17, wherein the stored processor-executable instructions are configured to cause the processing system to perform operations further comprising:

in response to determining that the received IPv4 packets are downstream packets:

determining whether the received packets match an entry in the address and port set identifier to MAC hash table; and rewriting a header in the received packets to direct the packets to a CPE with the corresponding MAC address.

19. The non-transitory processor readable media of claim 15, wherein the stored processor-executable instructions are configured to cause the processing system to perform operations further comprising intercepting and proxying a provisioning request.

20. A non-transitory processor readable media having stored thereon processor-executable instructions configured to cause a processing system in a customer premise device (CPE) perform operations comprising:

initiating a dynamic host configuration protocol version 6 (DHCPv6) transaction to request network configuration information from an access termination component;

receiving a DHCPv6 response from the access termination component, the response including IPv6 provisioning parameters and augmented RFC 7598 rule data;

determining an IPv4 address for the subscriber CPE based on the received IPv6 provisioning parameters;

determining an IPv4 gateway prefix route and default gateway address for forwarding traffic based on the augmented RFC 7598 rule data;

associating the computed IPv4 gateway prefix route with the core-facing interface;

determining an allowed range of source ports for network address and port translation (NAPT) based on the received IPv6 provisioning parameters; and applying the determined range of source ports for NAPT operations on the determined IPv4 address.

21. The non-transitory processor readable media of claim 20, wherein the stored processor-executable instructions are configured to cause the processing system to perform operations further comprising determining whether to bind the determined IPv4 address to a core-facing interface of the subscriber CPE or use the determined IPv4 address exclusively within Source Network Address Translation (SNAT) operations.

* * * * *